United States Patent
Larsson et al.

(10) Patent No.: US 10,219,217 B2
(45) Date of Patent: Feb. 26, 2019

(54) ASSISTING MEASUREMENTS IN SMALL CELLS WITH AN ON/OFF SCHEME

(71) Applicant: Telefonaktiebolaget L M Ericsson (publ), Stockholm (SE)

(72) Inventors: Daniel Larsson, Vallentuna (SE); Ali Behravan, Stockholm (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 160 days.

(21) Appl. No.: 14/421,930

(22) PCT Filed: Jan. 29, 2015

(86) PCT No.: PCT/SE2015/050100
§ 371 (c)(1),
(2) Date: Feb. 16, 2015

(87) PCT Pub. No.: WO2015/115986
PCT Pub. Date: Aug. 6, 2015

(65) Prior Publication Data
US 2016/0262100 A1 Sep. 8, 2016

Related U.S. Application Data

(60) Provisional application No. 61/933,915, filed on Jan. 31, 2014.

(51) Int. Cl.
| H04L 12/28 | (2006.01) |
| H04W 52/02 | (2009.01) |
| H04W 48/16 | (2009.01) |
| H04W 84/04 | (2009.01) |

(52) U.S. Cl.
CPC ....... H04W 52/0216 (2013.01); H04W 48/16 (2013.01); H04W 52/0206 (2013.01);
(Continued)

(58) Field of Classification Search
CPC ............ H04W 52/0216; H04W 48/16; H04W 52/0206; H04W 52/0229; H04W 84/045
See application file for complete search history.

(56) References Cited

U.S. PATENT DOCUMENTS

| 2010/0202434 A1* | 8/2010 | Wu ...................... H01Q 21/205 370/345 |
| 2012/0257515 A1* | 10/2012 | Hugl ...................... H04W 24/10 370/252 |

(Continued)

FOREIGN PATENT DOCUMENTS

| WO | 2012136846 A1 | 10/2012 |
| WO | 2014013531 A1 | 1/2014 |

OTHER PUBLICATIONS

3GPP, "3rd Generation Partnership Project; Technical Specification Group Radio Access Network; Small cell enhancements for E-UTRA and E-UTRAN—Physical layer aspects (Release 12)", 3GPP TR 36.872 V12.1.0, Dec. 2013, 1-100.

(Continued)

*Primary Examiner* — Abdelnabi O Musa
(74) *Attorney, Agent, or Firm* — Murphy, Bilak & Homiller, PLLC

(57) ABSTRACT

Techniques are provided to ensure that a terminal device is able to perform measurements efficiently when an on/off scheme is used by network nodes, particularly in a heterogeneous network environment. An example method, implemented in a network node, comprises obtaining (720) a discovery signal window pattern, the discovery signal window pattern defining one or more discovery signal windows during which each of a plurality of cells is to transmit a corresponding discovery signal, and sending (730) an indication of the discovery signal window pattern to a terminal device.

35 Claims, 7 Drawing Sheets

(52) U.S. Cl.
CPC ...... *H04W 52/0229* (2013.01); *H04W 84/045* (2013.01); *Y02D 70/1226* (2018.01); *Y02D 70/1242* (2018.01); *Y02D 70/1244* (2018.01); *Y02D 70/1262* (2018.01); *Y02D 70/142* (2018.01); *Y02D 70/146* (2018.01); *Y02D 70/164* (2018.01); *Y02D 70/21* (2018.01); *Y02D 70/24* (2018.01)

(56) References Cited

U.S. PATENT DOCUMENTS

| | | | | |
|---|---|---|---|---|
| 2014/0010131 | A1* | 1/2014 | Gaal | H04W 52/0229 370/311 |
| 2014/0038598 | A1* | 2/2014 | Ren | H04W 48/16 455/434 |
| 2015/0029919 | A1* | 1/2015 | Han | H04W 48/16 370/311 |
| 2015/0098416 | A1* | 4/2015 | Kuo | H04W 72/10 370/329 |
| 2016/0057603 | A1* | 2/2016 | Tiirola | H04W 8/005 370/329 |
| 2016/0081111 | A1* | 3/2016 | Yi | H04L 5/001 370/280 |
| 2016/0212650 | A1* | 7/2016 | Zheng | H04W 24/10 |

OTHER PUBLICATIONS

Unknown, Author, "Control plane impacts of small cell DTX", Broadcom Corporation, 3GPP TSG.RAN2#86, R2-142124, Seoul, South Korea, May 19-23, 2014, 1-6.

Unknown, Author, "Discussion on network assistance signaling for small cell discovery", Huawei, HiSilicon, 3GPP TSG RAN WGl Meeting #78, R1-142828, Dresden, Germany, Aug. 18-22, 2014, 1-5.

Unknown, Author, "Enhanced small cell on/off procedures", ZTE, 3GPP TSG RAN WG1 Meeting #76bis, R1-141404, Shenzhen, China, Mar. 31-Apr. 4, 2014, 1-5.

Unknown, Author, "Small Cell Discovery for Efficient Small Cell On/Off Operation", NTT DOCOMO, 3GPP TSG RAN WG1 Meeting #74, R1-133457, Barcelona, Spain, Aug. 19-23, 2013, 1-8.

3GPP, "3rd Generation Partnership Project; Technical Specification Group Radio Access Network; Small cell enhancements for E-UTRA and E-UTRAN—Physical layer aspects (Release 12)", 3GPP TR 36.872 V12.0.0, Sep. 2013, 1-77.

Unknown, Author, "Heterogeneous Network Deployment Scenarios", Ericsson, ST-Ericsson, 3GPP TSG-RAN WG1 #70bis, R1-124513, San Diego, CA, USA, Oct. 8-12, 2012, 1-3.

Unknown, Author, "Initial considerations on Heterogeneous Networks for UMTS", Ericsson, ST-Ericsson, 3GPP TSG RAN WG1 Meeting #70bis, R1-124512, San Diego, CA, USA, Oct. 8-12, 2012, 1-7.

Unknown, Author, "New WI proposal: Small cell enhancements—Physical layer aspects—Core Part", Huawei, CATR, HiSilicon, 3GPP TSG RAN Meeting #62, RP-132073, Busan, Korea, Dec. 3-6, 2013, 1-7.

Unknown, Author, "Proposed SID: Study on UMTS Heterogeneous Networks", Huawei, HiSilicon, TSG RAN Meeting #57, RP-121436, Chicago, USA, Sep. 4-7, 2012, 1-5.

Unknown, Author, "Views on Radio-Interface Based Synchronization Mechanisms", NTT DOCOMO, 3GPP TSG RAN WG1 Meeting #73, R1-132679, Fukuoka, Japan, May 20-24, 2013, 1-4.

\* cited by examiner

ASSISTING MEASUREMENTS IN SMALL CELLS WITH AN ON/OFF SCHEME

TECHNICAL FIELD

The technology disclosed herein relates generally to wireless telecommunications networks, and more particularly relates to techniques for performing mobility measurements in such networks.

BACKGROUND

Heterogeneous Networks

In a typical cellular radio system, mobile terminals (also referred to as user equipment, UEs, wireless terminals, terminal devices, and/or mobile stations) communicate via a radio access network (RAN) with one or more core networks, which provide access to data networks, such as the Internet, and/or to the public-switched telecommunications network (PSTN). A RAN covers a geographical area that is divided into cell areas, with each cell area being served by a radio base station (also referred to as a base station, a RAN node, a "NodeB", and/or an enhanced NodeB or "eNB"). A cell area is a geographical area over which radio coverage is provided by the base station equipment at a base station site. The base stations communicate through radio communication channels with wireless terminals within range of the base stations.

Cellular communications system operators have begun offering mobile broadband data services based on, for example, WCDMA (Wideband Code-Division Multiple Access), HSPA (High-Speed Packet Access), and Long Term Evolution (LTE) wireless technologies. Fueled by the introduction of new devices designed for data applications, end user performance requirements continue to increase. The increased adoption of mobile broadband has resulted in significant growth in traffic handled by high-speed wireless data networks. Accordingly, techniques that allow cellular operators to manage networks more efficiently are desired.

Techniques to improve downlink performance may include Multiple-Input-Multiple-Output (MIMO) multi-antenna transmission techniques, multi-flow communication, multi-carrier deployment, etc. Since spectral efficiencies per link may be approaching theoretical limits, next steps may include improving spectral efficiencies per unit area. Further efficiencies for wireless networks may be achieved, for example, by changing a topology of traditional networks to provide increased uniformity of user experiences throughout a cell. Currently, so-called heterogeneous networks are being developed by members of the 3rd-Generation Partnership Project (3GPP), as discussed, for example, in: RP-121436, "Study on UMTS Heterogeneous Networks," TSG RAN Meeting #57, Chicago, USA, 4-7 Sep. 2012; R1-124512, "Initial considerations on Heterogeneous Networks for UMTS," Ericsson, ST-Ericsson, 3GPP TSG RAN WG1 Meeting #70bis, San Diego, Calif., USA, 8-12 Oct. 2012; and R1-124513, "Heterogeneous Network Deployment Scenarios," Ericsson, ST-Ericsson, 3GPP TSG-RAN WG1 #70bis, San Diego, Calif., USA, 8-12 Oct. 2012.

A homogeneous network is a network of base stations (also referred to as NodeBs, enhanced NodeBs, or eNBs) in a planned layout, providing communications services for a collection of user terminals (also referred to as user equipment nodes, UEs, terminal devices, and/or wireless terminals), in which all base stations typically have similar transmit power levels, antenna patterns, receiver noise floors, and/or backhaul connectivity to the data network. Moreover, all base stations in a homogeneous network may generally offer unrestricted access to user terminals in the network, and each base station may serve roughly a same number of user terminals. Current cellular wireless communications systems in this category may include, for example, GSM (Global System for Mobile communication), WCDMA, HSDPA (High Speed Downlink Packet Access), LTE (Long Term Evolution), WiMAX (Worldwide Interoperability for Microwave Access), etc.

In a heterogeneous network, low power base stations (also referred to as low power nodes (LPNs), micro nodes, pico nodes, femto nodes, relay nodes, remote radio unit nodes, RRU nodes, small cells, RRUs, etc.) may be deployed along with or as an overlay to planned and/or regularly placed macro base stations. A macro base station (MBS) may thus provide service over a relatively large macro cell area, and each LPN may provide service for a respective relatively small LPN cell area within the relatively large macro cell area.

Power transmitted by an LPN may be relatively small, e.g., 2 Watts, compared to power transmitted by a macro base station, which may be 40 Watts for a typical macro base station. An LPN may be deployed, for example, to reduce/eliminate a coverage hole(s) in the coverage provided by the macro base stations, and/or to off-load traffic from macro base stations, such as to increase capacity in a high traffic location or so-called hot-spot. Due to its lower transmit power and smaller physical size, an LPN may offer greater flexibility for site acquisition.

Thus, a heterogeneous network features a multi-layered deployment of high-power nodes (HPNs), such as macro base stations, and low-power nodes (LPNs), such as so-called pico-base stations or pico-nodes. The LPNs and HPNs in a given region of a heterogeneous network may operate on the same frequency, in which case the deployment may be referred to as a co-channel heterogeneous deployment, or on different frequencies, in which case the deployment may be referred to as an inter-frequency or multi-carrier or multi-frequency heterogeneous deployment.

Inter-Cell Interference Coordination

Inter-cell interference presents a big performance issue for cell edge users. In a heterogeneous network, the impact of inter-cell interference can be worse than is generally seen in homogeneous networks, due to large differences between the transmit power levels of macro base stations and LPNs. This is illustrated in FIG. 1, which illustrates a heterogeneous network deployment 100 in which two pico-nodes 130 have coverage areas that fall within the coverage area 120 of macro node 110. The cross-hatched regions 140 in FIG. 1 cover a region between an outer circle and an inner circle around each LPN. The inner circle represents an area where the received power from the LPN is higher than that from the macro base station. The outer circle represents an area where the path loss to the LPN base station is smaller than that to the macro base station.

The cross-hatched area 140 between the inner and outer circles is often referred to as the "imbalance zone." This imbalance zone 140 could potentially be an LPN range-expansion area because, from the uplink (terminal-to-base-station) perspective, the system would prefer that the terminal still be served by the LPN within this area. However, from the downlink (base-station-to-terminal) perspective, terminals at the outer edge of such an imbalance zone, such as terminal 150a in FIG. 1, experience a very large received-power difference between the macro and LPN layers. For example, if the transmit power levels are 40 watts and 1 watt for the macro node and LPN, respectively, this power difference can be as high as 16 dB. In contrast, terminals relatively far away from the pico-nodes 130, such as mobile terminal 150b, are not affected, because the received powers from the LPNs are significantly less than that received from the macro base station 110.

As a result of these power differences, if a terminal in the range-expansion zone is served by a LPN cell and the macro cell is serving another terminal at the same time, using the same radio resources, then the terminal served by the LPN is subject to very severe interference from the macro base station.

Inter-cell interference coordination (ICIC) is supported in LTE networks, and is managed by signaling sent between eNodeBs via the eNodeB-to-eNodeB X2 interface. Each cell can signal to its neighboring cells, identifying high-power resource blocks in the frequency or time domains. This allows the neighboring cells to schedule cell-edge users in such a way as to avoid these high-power resource blocks. Such a mechanism can be used to reduce the impact of inter-cell interference.

Small-Cell On/Off

One of the mechanisms under development by members of the 3rd-Generation Partnership Project (3GPP) for inter-ference avoidance and coordination among small cells is a small-cell on/off feature. According to this feature, a small cell may be turned on and off from time to time, where the "on" and "off" periods may depend on the criteria or application.

The small-cell on/off feature may be implemented in semi-static or dynamic versions. With semi-static small-cell on/off, in which the on/off periods are very long, compared to the system's transmission-time intervals, criteria for cell on/off can be traffic load, terminal device arrival/departure, etc. On the other hand, with dynamic small-cell on/off, the small cell can be turned on and off at the level of a single subframe. The criteria in this case can be packet arrival/ completion or interference coordination and avoidance (e.g., to reduce interference towards other nodes or UEs). This means that the cell turns off at the subframe boundary (or end of current subframe) when the transmission of packet is completed and turns on at the next subframe boundary where a packet arrives.

In addition to its advantages in reducing interference, the small-cell on/off feature can also provide energy savings. Some preliminary evaluation of the energy saving impact of the small-cell on/off is presented in the 3GPP document, "Small cell enhancements for E-UTRA and E-UTRAN; Physical layer aspects," 3GPP TR 36.872, ver. 12.0.0 (available at www.3gpp.org).

There are three primary operational modes of the small-cell on/off feature:

Handover: In this mode a terminal device in CONNECTED mode is always attached to a cell. Due to increased traffic demand, for example, the network may decide to offload all or part of traffic for a given terminal device by handover to a small cell. The small cell, which may be "off", wakes up to serve the terminal device. The handover time in this case depends on the backhaul delay and the handover execution time. After completion of the transmission and/or reception of data the terminal device goes to IDLE mode or handed over to another cell, and the small cell can be turned off.

SCell only: In this mode a terminal device supporting carrier-aggregation (CA) is connected to a primary carrier or primary cell (PCell), and the network configures a secondary carrier or secondary cell (SCell) that can be turned on or off. If the network decides to offload the terminal device traffic to the SCell, then the SCell is turned on.

Serving cell (which may be the PCell in a CA scenario): In this mode a cell can be either on or off when a terminal device is connected to it. The procedures for radio resource management (RRM), radio link management (RLM) and channel-state information (CSI) measurements must be designed for this case.

Discovery Signal

In small-cell on/off deployments where the eNB can be off for long periods of time, a discovery signal might be needed to assist the terminal device with the measurements that it must perform. (These measurements are discussed in further detail below.) The discovery signal needs to support the properties for enabling RRM measurements, RLM-related procedures, and coarse time/frequency synchronization. To make the terminal device measurements possible, the eNB must wake up periodically (e.g., once every 80 or 160 milliseconds) and transmit the discovery signal so that it can be used by the terminal device for mobility related operations such as cell identification, RLM and measurement.

Since the discovery signal is generally rather sparse in time, it is desirable that the terminal device is able to make a meaningful measurement in one instance of the discovery signal, rather than having to wait for multiple instances that may occur tens or hundreds of milliseconds apart. In addition, to make measurements based on fewer samples in time more reliable, a discovery signal that only includes a few samples per instance may need to be sent over a wide bandwidth (e.g., the whole bandwidth used by the eNB or by the system).

Considering the above desired properties, one option for such discovery signals is to use currently existing signals as the discovery signal, such as the existing primary/second synchronization signals (PSS/SSS), common reference symbols (CRS), channel-state information reference symbols (CSI-RS), and/or positioning reference symbols (PRS). This enables UEs to reuse current functionality to a large extent, and also has the potential of creating the least impact to the system design. Another option is to use currently existing signals that are augmented in some manner. A third option is to design a completely new discovery signal.

Another alternative is to base the discovery signal on uplink (UL) signals. A UL discovery signal can be an existing signal such as sounding reference signals (SRS), etc., or a new signal. Desirable properties of an UL discovery signal are similar to those for a DL discovery signal. However, since the mechanism of the discovery in the UL can be different, the design of such signal can be different too. The UL discovery signal can be used for uplink measurements (e.g., for UL transmit-timing accuracy) or for measurements that use both UL and DL discovery signals, such as UE Rx-Tx time difference, eNB Rx-Tx time difference measurements, etc.

Terminal Device Measurements

To support different functions such as mobility, which in turn includes the functions of cell selection, cell reselection, handover, RRC re-establishment, connection release with redirection, etc., as well as to support other functions such as minimization of drive tests, self-organizing network (SON), positioning, etc., the terminal device is required to perform one or more radio measurements (e.g., timing measurements, signal strength measurements or other signal quality measurements) on signals transmitted by neighboring cells, i.e., by cells other than the cell serving the terminal device. Prior to performing such measurements the terminal device generally has to identify the cell from which a signal is sent, and determine the cell's physical cell identity (PCI). Therefore, PCI determination can also be considered a type of a measurement.

The terminal device receives measurement configuration or assistance data/information, which is a message or an information element (IE) sent by the network node (e.g., a serving eNodeB, positioning node, etc.) to configure the terminal device to perform the requested measurements. For example, the measurement configuration may contain information related to the carrier frequency to be measured, a radio-access technology (RAT) or RATs to be measured, a type of measurement (e.g., Reference Signal Received Power, or RSRP), whether higher-layer time-domain filtering should be performed, measurement bandwidth related parameters, etc.

The measurements are done by the terminal device on the serving cell as well as on neighbor cells, over some known reference symbols or pilot sequences. The measurements are done on cells on an intra-frequency carrier, inter-frequency carrier(s) as well as on inter-RAT carriers(s) (depending upon the UE's capability for supporting a particular RAT or RATs).

In RRC connected state, the terminal device can perform intra-frequency measurements without using measurement gaps (i.e., intervals in which the mobile terminal receiver may re-tune to another frequency and/or configure itself for a different RAT). However, as a general rule the terminal device performs inter-frequency and inter-RAT measurements in measurement gaps unless it is capable of performing them without gaps. To enable inter-frequency and inter-RAT measurements that require gaps, the network has to configure measurement gaps for the terminal device. Two periodic measurement gap patterns, both with a measurement gap length of 6 milliseconds, are defined for LTE:

Measurement gap pattern #0 with repetition period 40 milliseconds; and
Measurement gap pattern #1 with repetition period 80 milliseconds.

In High-Speed Packet Access (HSPA) networks, the inter-frequency and inter-RAT measurements are performed in compressed mode gaps, which are also a type of network-configured measurement gap.

Some measurements may also require a terminal device to measure the signals transmitted by the terminal device in the uplink. The measurements are done by the terminal device in RRC connected state or in CELL_DCH state (in HSPA) as well as in low activity RRC states (e.g., idle state, CELL_FACH state in HSPA, URA_PCH and CELL_PCH states in HSPA, etc.). In a multi-carrier or carrier aggregation (CA) scenario, the terminal device may perform the measurements on the cells on the primary component carrier (PCC) as well as on the cells on one or more secondary component carriers (SCCs).

These measurements are done for various purposes. Some example measurement purposes are: mobility, positioning, self-organizing network (SON), minimization of drive tests (MDT), operation and maintenance (O&M), network planning and optimization, etc. The measurements are typically performed over time durations on the order of a few hundreds of milliseconds to a few seconds. The same measurements are generally applicable to both single-carrier and carrier aggregation scenarios. However in carrier aggregation scenarios the specific measurement requirements may be different. For example, the measurement period may be different in carrier aggregation scenarios; i.e., it can be either relaxed or more stringent depending upon whether a secondary component carrier (SCC) is activated or not. This may also depend upon the UE's capability, i.e. whether a carrier aggregation-capable terminal device is able to perform measurements on an SCC with or without gaps.

Examples of mobility measurements in LTE include:
Reference symbol received power (RSRP); and
Reference symbol received quality (RSRQ).
Examples of mobility measurements in HSPA are:
Common pilot channel received signal code power (CPICH RSCP); and
CPICH Ec/No.
An example of mobility measurements in GSM/GERAN is:
GSM carrier RSSI.
Examples of mobility measurements in CDMA2000 systems are:
Pilot strength for CDMA2000 1×RTT; and
Pilot strength for HRPD.

Mobility measurements may also include the step of identifying or detecting a cell, which may belong to LTE, HSPA, CDMA2000, GSM, etc. Cell detection comprises identifying at least the physical cell identity (PCI) and subsequently performing the signal measurement (e.g., RSRP) of the identified cell. The terminal device may also have to acquire the cell global ID (CGI) of a terminal device. In HSPA and LTE the serving cell can request the terminal device to acquire the system information (SI) of the target cell. More specifically, the SI is read by the terminal device to acquire the cell global identifier (CGI), which uniquely identifies a cell of the target cell. The terminal device may also be requested to acquire other information such as CSG indicator, CSG proximity detection, etc., from the target cell.

Examples of positioning measurements in LTE are:
Reference signal time difference (RSTD); and
UE RX-TX time difference measurement.

The UE RX-TX time difference measurement requires the terminal device to perform measurement on the downlink reference signal as well as on the uplink transmitted signals.

Examples of other measurements which may be used for radio link maintenance, MDT, SON or for other purposes are:
Control channel failure rate or quality estimate e.g.,
Paging channel failure rate, and
Broadcast channel failure rate;
Physical layer problem detection e.g.,
Out of synchronization (out of sync) detection,
In synchronization (in-sync) detection,
Radio link monitoring, and
Radio link failure determination or monitoring.

Still other measurements performed by the terminal device include channel-state-information (CSI) measurements, which are used for scheduling, link adaptation, etc. by the network. Examples of CSI measurements are CQI, PMI, RI, etc.

The terminal device also performs measurements on the serving cell (also referred to as the primary cell, or PCell) in order to monitor the serving cell performance. These are called radio link monitoring (RLM) or RLM-related measurements in LTE. For RLM the terminal device monitors the downlink link quality based on the cell-specific reference signal in order to detect the downlink radio link quality of the serving or PCell.

In order to detect out-of-sync and in-sync status for a given radio link, the terminal device compares an estimated quality of the radio link with the thresholds Qout and Qin, respectively. The thresholds Qout and Qin are defined to correspond to signal quality levels below which the downlink radio link cannot be reliably received, and respectively correspond to 10% and 2% block-error-rates for a hypothetical PDCCH transmissions.

Radio measurements performed by the terminal device are used by the terminal device for one or more radio operational tasks. Examples of such tasks are reporting the measurements to the network, which in turn may use them for various tasks. For example, in RRC connected state the terminal device reports radio measurements to the serving node. In response to the reported terminal device measurements, the serving network node takes certain decisions, e.g., it may send a mobility command to the terminal device for the purpose of cell change. Examples of cell change are handover, RRC connection re-establishment, RRC connection release with redirection, primary cell (PCell) change in CA, Primary Component Carrier (PCC) change in PCC, etc. An example of cell change in idle or low activity state is cell reselection. In another example, the terminal device may itself use the radio measurements for performing tasks e.g., cell selection, cell reselection, etc.

A radio network node (e.g., base station) may also perform signal measurements. Examples of radio network node measurements in LTE are propagation delay between terminal device and itself, UL SINR, UL SNR, UL signal strength, Received Interference Power (RIP), etc. An eNB or other radio network node may also perform positioning measurements, which are described in a later section.

A typical serving cell or neighbor cell measurement quantity is based on the non-coherent averaging of 2 or more basic non-coherently averaged samples, each of which may be the result of the non-coherent averaging of one or more short (e.g., 1-millisecond) coherent measurements. The exact sampling for any given measurement depends upon the implementation of the terminal device or network node radio, and is generally not specified.

An example of RSRP measurement averaging in E-UTRAN is shown in FIG. 2. The figure illustrates that the terminal device obtains the overall measurement quantity result by collecting four non-coherent averaged samples or snapshots (each of 3-milliseconds length, in this example) during a physical layer measurement period (e.g., 200 milliseconds), when no discontinuous receive (DRX) is used or when DRX cycle is not larger than 40 milliseconds. Every coherent averaged sample is 1-millisecond long. The sampling also depends upon the length of the DRX cycle. For example, for DRX cycles greater than 40 milliseconds, the terminal device typically takes one sample every DRX cycle over the measurement period. A similar measurement sampling mechanism is used for other signal measurements by the terminal device and also by the base station for UL measurements.

SUMMARY

In densely deployed small cells it is necessary to ensure low interference between cells in order to make efficient operation. As discussed above, a mechanism that has been introduced to guarantee low interference between cells is small-cell on/off. Small-cell on/off functionality also can be used for energy saving.

Depending on its time scale, the on/off scheme can have an impact on terminal device (e.g., UE) measurements, since certain reference signals must be available for particular measurements. Disclosed herein are techniques and apparatus for enabling efficient measurements in small-cell on/off scenarios.

Therefore, techniques are needed to ensure that the terminal device is able to perform measurements efficiently when the on/off scheme is used by the network nodes. Several such techniques are described herein, including techniques implemented in a network node, such as an LTE eNB, and in a terminal device, such as a LTE UE.

One example embodiment is a method performed in a network node that is adapted to configure a terminal device with measurements. This example method comprises the following operations:

obtaining at least one composite pattern of discovery signals, i.e., a discovery signal window pattern that defines one or more discovery signal windows during which each of a plurality of cells is to transmit a corresponding discovery signal. The obtaining may include creating the composite pattern or otherwise determining the composite pattern. The composite pattern comprises at least one 'discovery time window (Tw),' which may be a periodic window or an aperiodic window, during which discovery signals are transmitted in a plurality of cells.

signaling, i.e., sending, the created or determined composite pattern of the discovery signals, or an indication thereof, to the terminal device for enabling it to perform one or more measurements.

Additional steps that might also be performed in the network node include, but are not limited to:

signaling the created or determined composite pattern of the discovery signals to other network nodes; and/or adapting or adjusting one or more terminal device and/or network node measurement procedures and/or configuration parameters that are based on or associated with the composite pattern of discovery signals.

Another example embodiment is a method performed in a terminal device that is adapted to be configured with measurements by a network node. This example method includes the following operations:

obtaining at least one composite pattern of discovery signals, i.e., a discovery signal window pattern that defines one or more discovery signal windows during which each of a plurality of cells is to transmit a corresponding delivery. The composite pattern thus comprises at least one 'discovery time window (Tw),' which may be a periodic window or an aperiodic window, during which discovery signals are transmitted in a plurality of cells; and performing one or more measurements for one or more of the plurality of cells during the one or more discovery signal windows, using discovery signals transmitted in the cells according to the obtained composite pattern.

Additional steps that may further be performed in the terminal device include, but are not limited to:

adapting or adjusting one or more terminal device measurement procedures, which are based on or use the obtained composite pattern; and/or signaling a capability to the network node indicating that the terminal device is capable of obtaining and/or using the obtained composite pattern of the discovery signals for performing one or more measurements.

Other embodiments of the presently disclosed technology include a network node adapted to carry out one or more of the network-based methods summarized above, i.e., to obtain a discovery signal window pattern, the discovery signal window pattern defining one or more discovery signal windows during which each of a plurality of cells is to transmit a corresponding discovery signal, and to send an indication of the discovery signal window pattern to a terminal device. Still other embodiments include a terminal device adapted to carry out one or more of the terminal-based methods summarized above, i.e., to obtain a discovery signal window pattern, the discovery signal window pattern defining one or more discovery signal windows during which each of a plurality of cells is to transmit a corresponding discovery signal, and to perform one or more measurements for one or more of the plurality of cells during the one or more discovery signal windows. Yet other embodiments comprise computer program products and computer-readable media comprising computer program instructions for carrying out the above-summarized methods.

Examples of these and other methods, as well as the corresponding apparatus and computer program products, are described in detail below.

DETAILED DESCRIPTION

Figure 1:
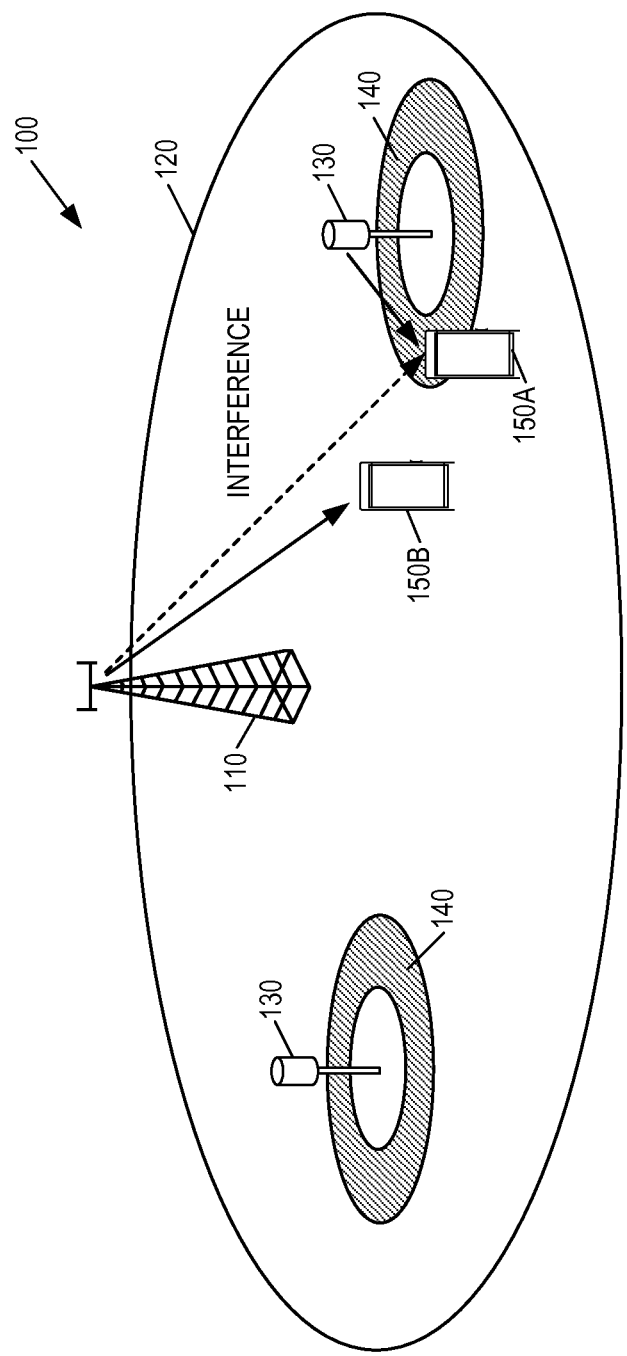
FIG. 1 is a schematic diagram of a heterogeneous network in which the techniques described herein may be applied.
Figure 2:
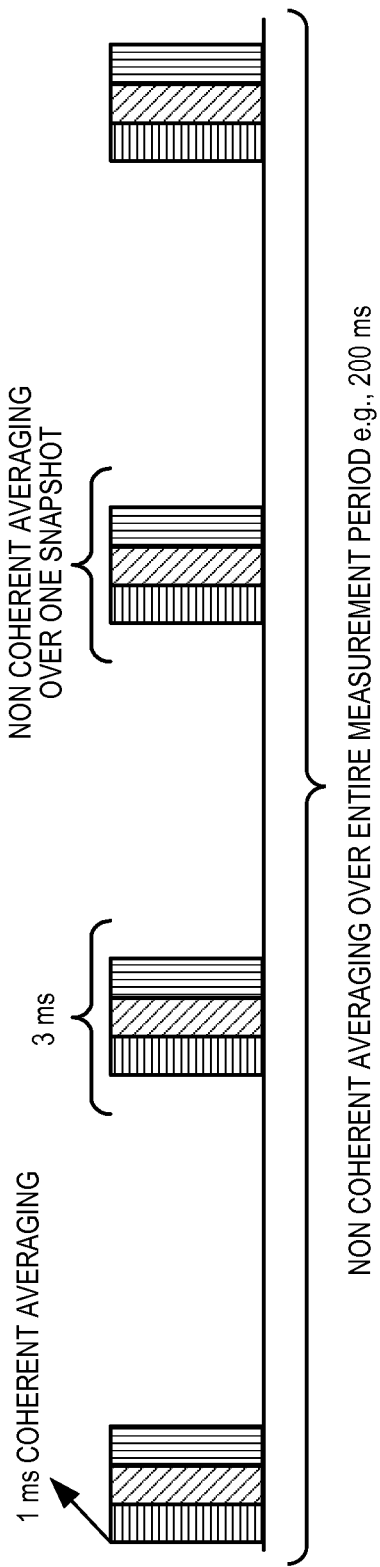
FIG. 2 illustrates an example of measurement averaging as performed by a terminal device.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, these and other embodiments of present inventive concepts are described herein in the context of operating in a Radio Access Network (RAN) that communicates over radio communication channels with mobile terminals (also referred to as terminal devices, wireless terminals or UEs). As used herein, a mobile terminal, terminal device, wireless terminal, or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) between, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers that make up the UMTS radio access network. Thus, UTRAN is essentially a radio access network using wideband code division multiple access (WCDMA) for terminal devices.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from LTE and or UMTS is used in this disclosure to exemplify embodiments of the inventive concepts, this should not be seen as limiting the scope of inventive concepts to only these systems. Other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and terminal device, wireless terminal or mobile terminal (also referred to as User Equipment node or UE) should be considering non-limiting and does not imply a certain hierarchical relation between the two. In general, a base station (e.g., a "NodeB" or "eNodeB") and a terminal device (e.g., a "UE") may be considered as examples of respective different communications devices that communicate with each other over a wireless radio channel.

While embodiments discussed herein may focus, for purposes of illustration, on example embodiments in which described solutions are applied in heterogeneous networks that include a mix of relatively higher-power base stations (e.g., "macro" base stations, which may also be referred to as wide-area base stations or wide-area network nodes) and relatively lower-power nodes (e.g., "pico" base stations, which may also be referred to as local-area base stations or local-area network nodes), the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks keeps increasing along with this ever-increasing user demand. The latest systems such as Long Term Evolution (LTE), especially when coupled with interference mitigation techniques, have spectral efficiencies very close to theoretical Shannon limit. The continuous upgrading of current networks to support the latest technologies and densifying the number of base stations per unit area are two of the most widely used approaches to meet the increasing traffic demands.

One upgrade approach that is gaining high attention involves the deployment of so-called heterogeneous networks, where the traditional pre-planned macro base stations (known as the macro layer) are complemented with several low-powered base stations that may in some cases be deployed in an ad hoc manner. The 3rd Generation Partnership Project (3GPP) has incorporated the concept of Heterogeneous Networks as one of the core items of study in the latest enhancements of LTE, such as LTE release 11, and several low-powered base stations to realize heterogeneous networks such as pico base stations, femto base stations (also known as home base stations or HeNBs), relays, and RRHs (remote radio heads) have been defined. Similar concepts are being applied to upgrade UMTS networks, as well.

Figure 3:
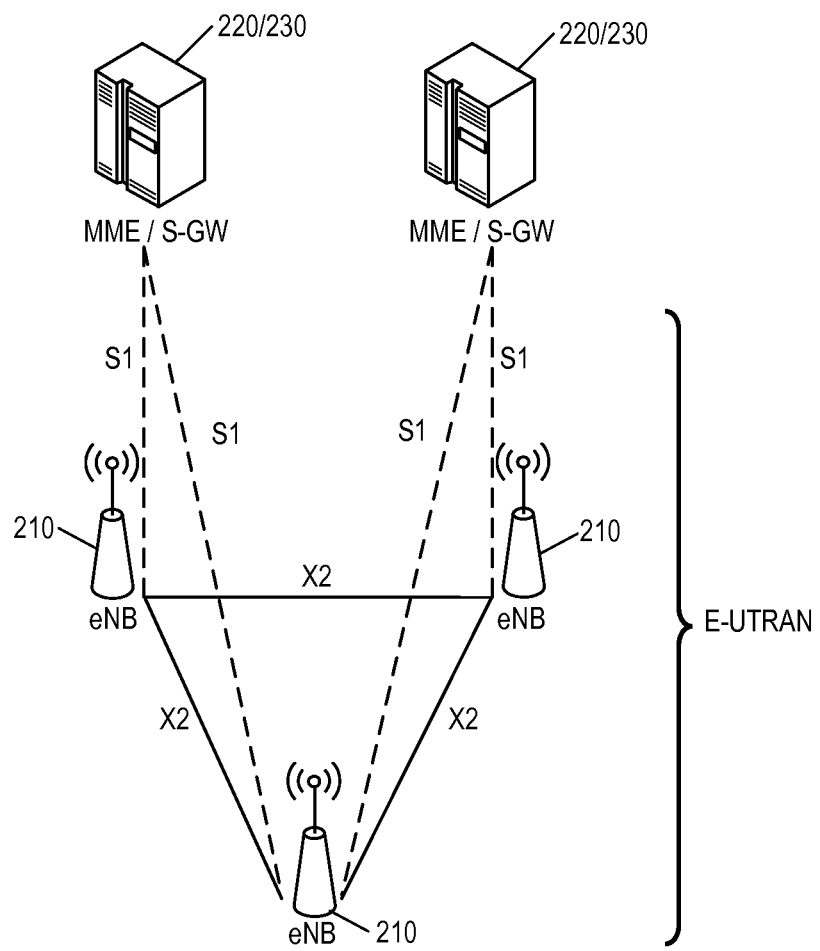
FIG. 3 illustrates components of an LTE network.

The Evolved UMTS Terrestrial Radio Access Network (E-UTRAN) includes base stations called enhanced NodeBs (eNBs or eNodeBs), providing the E-UTRA user plane and control plane protocol terminations towards the terminal device. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. A simplified view of the E-UTRAN architecture is illustrated in FIG. 3.

The eNB 210 hosts functionalities such as Radio Resource Management (RRM), radio bearer control, admission control, header compression of user plane data towards serving gateway, and/or routing of user plane data towards the serving gateway. The MME 220 is the control node that processes the signaling between the terminal device and the CN (core network). Significant functions of the MME 220 are related to connection management and bearer management, which are handled via Non Access Stratum (NAS) protocols. The S-GW 230 is the anchor point for terminal device mobility, and also includes other functionalities such as temporary DL (down link) data buffering while the terminal device is being paged, packet routing and forwarding to the right eNB, and/or gathering of information for charging and lawful interception. The PDN Gateway (P-GW, not shown in FIG. 3) is the node responsible for terminal device IP address allocation, as well as Quality of Service (QoS) enforcement (as further discussed below). The reader is referred to 3GPP TS 36.300 and the references therein for further details of functionalities of the different nodes.

In describing various embodiments of the presently disclosed techniques, the non-limiting term radio network node may be used to refer any type of network node serving terminal device and/or connected to other network node or network element or any radio node from where terminal device receives signal. Examples of radio network nodes are Node B's, base stations (BS), multi-standard radio (MSR) radio nodes such as MSR BS's, eNodeBs, network controllers, radio network controllers (RNCs), base station controllers, relays, donor nodes controlling relays, base transceiver stations (BTS), access points (AP), wireless routers, transmission points, transmission nodes, remote radio units (RRUs), remote radio heads (RRHs), nodes in a distributed antenna system (DAS), etc.

In some cases a more general term "network node" is used; this term may correspond to any type of radio network node or any network node that communicates with at least a radio network node. Examples of network nodes are any radio network node stated above, core network nodes (e.g., MSC, MME, etc.), O&M, OSS, SON, positioning nodes (e.g., E-SMLC), MDT, etc.

In describing some embodiments, the term terminal device is used, and refers to any type of wireless device communicating with a radio network node in a cellular or mobile communication system. Examples of terminal devices are user equipment (UE), target devices, device-to-device terminal devices, machine-type terminal devices or terminal devices capable of machine-to-machine communication, PDAs, wireless-enabled table computers, mobile terminals, smart phones, laptop embedded equipped (LEE), laptop mounted equipment (LME), USB dongles, customer premises equipment (CPE), etc. The term "mobile terminal" as used herein should be understood as being generally interchangeable with the terms UE and terminal device as used herein and in the various specifications promulgated by the 3GPP, but should not be understood as being limited to devices compliant to 3GPP standards.

Various embodiments of the presently disclosed techniques may be described in relation to specific intra- or inter-frequency measurements performed by the terminal device. However the embodiments are applicable to any kind of measurement, e.g., inter-frequency measurements, inter-RAT measurements, which in turn may belong to any RAT such as GSM/GERAN, UTRA FDD, UTRA TDD, CDMA2000, HRPD, WLAN, Wi-Fi, etc. As an example, a terminal device served by a UTRA cell may be configured by its serving network node to perform inter-RAT measurements (e.g., RSRP, RSRQ, etc.) during measurement gaps on one or more cells belonging to one or more E-UTRAN carrier frequencies.

Herein, the description of various embodiments of the inventive techniques is given with primary emphasis on single-carrier operation of the terminal device. However, the techniques disclosed are applicable for multi-carrier or carrier aggregation operation of the terminal device. For instance, those embodiments that involve the signaling of information to the terminal device or to one or more network nodes may be carried out independently for each cell on each carrier frequency supported by the network node, in some embodiments.

Under the normal operation of cells, a terminal device performs measurements on reference signals that are transmitted periodically and relatively frequently from the network node. The terminal device can generally assume that the reference signals are available with predefined configurations. However in a small-cell on/off scheme this is not necessarily the case, and a terminal device may not be able to perform certain measurements since the reference signals may not exist during the occasions generally assumed by the terminal device.

To perform a reliable measurement, the terminal device typically must obtain multiple samples or snapshots over a given measurement interval. Therefore, even if a terminal device is able to autonomously find appropriate signals at certain occasions, the performance might still be degraded, due to the lesser availability of reference signals in a discovery signal transmitted by a cell that has been turned "off" in a small-cell on/off scheme.

Another problem is that, under the on/off cell scheme, the reference signal may be transmitted at irregular intervals that cannot be predicted by the terminal device. This will require the terminal device to continuously detect the available reference signals. This in turn will increase terminal device complexity, drain its battery and would also lead to unpredictable measurement time.

Therefore, techniques are needed to ensure that the terminal device is able to perform measurements efficiently when the on/off scheme is used by the network nodes. Several such techniques are described herein, including techniques implemented in a network node, such as an LTE eNB, and in a terminal device, such as an LTE UE.

One example embodiment is a method performed in a network node that is adapted to configure a terminal device with measurements. This example method comprises the following operations:

creating or determining at least one composite pattern of discovery signals, wherein the composite pattern comprises at least one 'discovery time window (Tw),' which may be a periodic window or an aperiodic window, during which discovery signals are transmitted in a plurality of cells; and signaling the created or determined composite pattern of the discovery signals to the terminal device for enabling it to perform one or more measurements.

Additional steps that might also be performed in the network node include:

signaling the created or determined composite pattern of the discovery signals to other network nodes; and/or adapting or adjusting one or more terminal device and/or network node measurement procedures and/or configuration parameters that are based on or associated with the composite pattern of discovery signals.

Another example embodiment is a method performed in a terminal device that is adapted to be configured with measurements by a network node. This example method includes the following operations:

obtaining at least one composite pattern of discovery signals, wherein the composite pattern comprises at least one 'discovery time window (Tw),' which may be a periodic window or an aperiodic window, during which discovery signals are transmitted in a plurality of cells; and performing one or more measurements using discovery signals transmitted in one or more cells based on the obtained pattern.

Additional steps that may further be performed in the terminal device include:

adapting or adjusting one or more terminal device measurement procedures, which are based on or use the obtained pattern; and/or signaling a capability to the network node indicating that the terminal device is capable of obtaining and/or using the obtained composite pattern of the discovery signals for performing one or more measurements.

Detailed below are several embodiments of the presently disclosed techniques, including, but not limited to, the following:

methods in a network node of creating a composite pattern of discovery signals;

methods in a network node of signaling a composite pattern of discovery signals;

methods in a terminal device of obtaining a composite pattern of discovery signals;

methods of adapting measurement procedures accounting for a composite pattern of discovery signals; and methods in terminal device of signaling capability related to measurement based on a composite pattern of discovery signals.

Each of these types of methods is discussed in the subsections that follow.

Methods in Network Node to Create a Composite Pattern of Discovery Signals

According to this aspect of the present techniques, a network node obtains a composite pattern of discovery signals, which are transmitted by each of a plurality of cells, e.g., neighboring cells, serving and neighboring cells, etc. The composite pattern may also interchangeably be called a "combined pattern" or "common pattern" or "overall pattern of discovery signals" or simply "pattern." The pattern of discovery signals may also interchangeably be called a "pattern of discovery time windows containing discovery signals" or a "pattern of discovery time windows" or simply "pattern of windows."

The pattern of the discovery signals includes at least one "discovery time window" ("TW"), and may include a periodic or aperiodic series of discovery time windows. Each discovery time window, in turn:

consists of a series of consecutive subframes, slots or slots where at least one subframe, slot or symbol contains discovery signals used in at least one cell; and contains discovery signals from a plurality of cells, e.g., at least two cells. The discovery time window may also interchangeably be called a "discovery signal time window" or "discovery signal transmission time window."

The obtaining of the pattern may include creating, determining, and/or selecting a pattern from a plurality of patterns. For example, the composite pattern may be created by:

selecting a pattern that is one of a set of pre-defined patterns and based on pre-defined values of parameters associated with the pattern;

selecting a pattern that is one of a set of pre-defined patterns but that has certain parameters that are decided and selected/set by the network node;

creating a pattern that is not one of a set of pre-defined patterns but is based on one or more pre-defined values of parameters; and creating a pattern that is not one of set of pre-defined patterns but that is based on pre-defined parameters having values that are also decided and selected by the network node.

An advantage of introducing a discovery time window is that the terminal device measurement is more power efficient, since the terminal device needs to detect, identify and measure the discovery signals from plurality of cells only during this time window.

Figure 4:
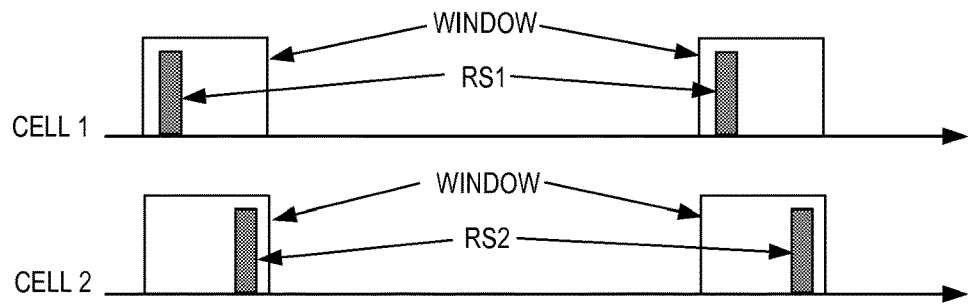
FIG. 4 is an illustration of example discovery time windows, with discovery signals from two cells.

FIG. 4 illustrates such discovery time window with two cells transmitting corresponding discovery signals with a shift inside the window.

Alternatively, instead of one periodic discovery window, there can be two or more discovery time windows of different lengths and different periodicities. This gives more freedom for discovery signal interference coordination. This also gives more freedom to the network nodes in terms of alignment of their discovery signals. For example, a cell may have to align its discovery signal with discovery signals from only a subset of neighboring cells.

Figure 5:
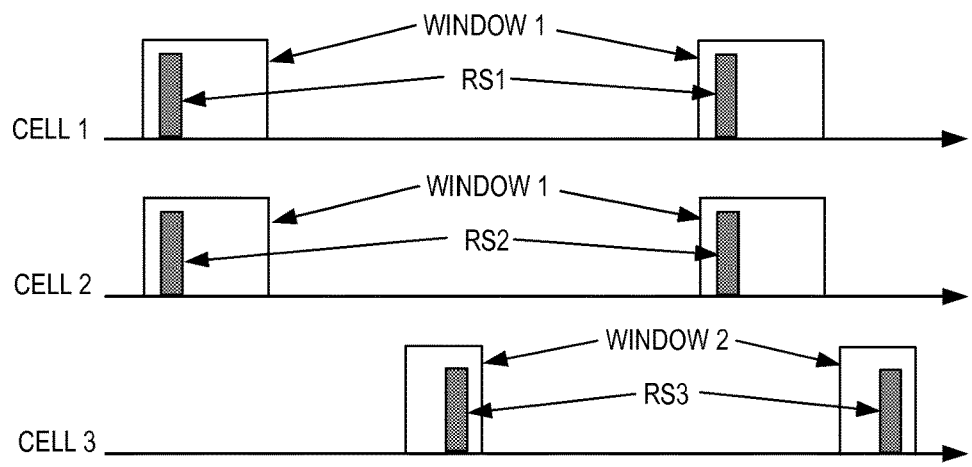
FIG. 5 illustrates another example of discovery time windows, with different periodicities and different lengths.

FIG. 5 shows the two cells as in as in FIG. 4, together with a third cell where the discovery signal from the third cell is transmitted in a different window with different duration and different periodicity.

All the cells whose discovery signals are to be included in the discovery time window (e.g., serving and neighboring cells on carrier f1) transmit at least some of their respective discovery signals so as to fall within the window. The network node may also obtain and/or receive the information about the discovery signals transmitted by the neighboring cells. The network node then uses the obtained and/or received information and also some pre-defined parameters or rules for determining the discovery time window. The determined window is then signaled to the terminal device. This enables the terminal device to measure the signal during the configured discovery time window.

Parameters Associated with Pattern of Discovery Time Window Containing Discovery Signals According to several embodiments of the presently disclosed techniques, a terminal device is configured with or otherwise obtains one or multiple patterns of discovery time windows, where the discovery time windows contain the discovery signals the terminal device needs to search for, and measures the discovery signals within certain time period. Prior to signaling the pattern of windows, the network node needs to determine certain parameters associated with the pattern of the window.

The determination of the pattern can be done by the network node based on pre-defined rules and/or can be performed autonomously by the network node that signals the windows to the terminal device. Alternatively, the patterns may also be fully or partially obtained by the terminal device, e.g., based on pre-defined rule and/or parameters. In yet another example, certain parameters of the pattern may be configured by the network node while the remaining ones are obtained by the terminal device. In any of these cases, the associated parameters may include one or more of the parameters described below.

Time-related information or parameters associated with the pattern of discovery time window may comprise of one or more of the following:
  a window starting time;
  a window duration;
  identifiers of cells within the discovery time window;
  inter-cell synchronization information;
  a window periodicity;
  a starting time of the pattern and number of windows per pattern; and
  a subframe offset.

The pattern of discovery time window may also be associated with frequency related information, e.g.:
  a carrier frequency of window;
  a bandwidth of discovery signals in the window;
  a frequency position of the discovery signal or the search windows frequency position;
  a radio access technology (RAT) associated with the discovery signal, e.g., LTE TDD, LTE FDD, etc.

The pattern of discovery time window may also be associated with:
  limited information in the case of common discovery time windows, i.e., where same pattern applies to several carriers to reduce overheads.

Several of the above parameters are explained in detail in the following sections.

Window Starting Time—

According to this aspect, the starting time of the window can be based on some reference time. In one exemplary embodiment, the reference time can be a global time or global clock, e.g., GPS time, GNSS time, etc.

In yet another exemplary embodiment, the reference time can be based on a local time within the network in which the window is used. More specifically, the reference time of the start of the window can be based on system frame number (SFN) of certain reference cell.

The reference cell can be the serving cell of the terminal device or it can be any other cell that the terminal device can identify or which is known to the terminal device. The reference cell (e.g., serving cell) can be pre-defined or indicated to the terminal device by the network node that configures the discovery time window. In the case of an indication sent by the network node, typically the reference cell ID (e.g., PCI, CGI, etc.) can be provided to the terminal device. The information may also include frequency of the reference cell, e.g., UL and/or DL EARFCN.

The reference time of the starting of the discovery time window, when based on SFN, can be obtained by the terminal device by one or more of the following means:
  one or more pre-defined values of SFN (e.g., SFN=0, SFN=512, etc.). In this case the window only starts at pre-defined SFN.
  signaled by the network node. For example the network node may indicate that the search time window for measuring cells on certain carrier (e.g., f1) starts at SFN=24 of the reference cell (e.g., serving cell). The terminal device knows the SFN of the serving cell and therefore it can determine the exact time when the window starts.

The starting time instants can be a fixed number of subframes, m, such that $$\text{SFN} \bmod m = 0,$$

or it may follow a range of numbers based on the SFN number. The range of numbers may also be pre-defined or signaled to the terminal device.

Another example of how to signal the starting time would be as follows $$(10 \times n_f + \lfloor n_s/2 \rfloor - \Delta_{DRS}) \bmod T_{DRS} = 0,$$

where $n_f$ is the frame number, $n_s$ is the slot number within the frame, $\Delta_{DRS}$ is the subframe offset, and $T_{DRS}$ is the periodicity of the discovery signal. The periodicity of the discovery signal could also be configured on a slot basis instead, compared to the above example that is based on a subframe basis.

The above parameters can be, for example, based on the terminal device's current primary cell. Alternatively, they can be based on the serving cell or any other cell on the frequency for which the discovery signal measurements are performed.

Window Duration—

Information about the duration of the window also needs to be provided to the terminal device. The efficiency of the discovery time window partly depends on the duration of the window. One or more possible durations of the window can be pre-defined or can be determined by the network node. The duration may be expressed in terms of number of subframes or time slots or even SFN with respect to SFN of starting time of the window.

The network node may determine or select one out of the pre-defined durations of discovery time windows based on one or more criteria, e.g.:

Flexible transmission of discovery signals: A wider window provides more flexibility to the network nodes for transmitting discovery signals. If a large number of cells (e.g., 16 or more) is involved, then it is more difficult to align the transmission timing of their discovery signals. In this case, the network node may select or create a larger window duration. An example of a wider window is one that includes several frames, e.g., 3 frames.

Interference reduction or avoidance: Another advantage of a wider window is that it allows for better interference coordination among different cells. This is because with a larger window the transmission of the discovery signals from at least certain cells can be scheduled during non-overlapping times. This avoids collision of the discovery signals from different cells. This in turn enables the terminal device to more easily detect the cells whose discovery signals fall within the duration of the discovery time window.

Terminal device complexity: The terminal device complexity and amount of processing needed increases if it has to measure several cells at the same time or within certain time. Therefore, to reduce terminal device complexity, the network node may configure a wider or moderate duration of the window, e.g., 1 or 2 frames.

Terminal device power consumption: On the other hand, a wide window reduces the power efficiency of the terminal device, since it has to do measurements for a longer period of time. That is, it has to search cells at different times spread in the window. In order to enable the saving of the terminal device battery power, the network node may configure a shorter window, e.g., less than or equal to one frame.

The network then configures the terminal device through, for example RRC, with the length of the search window.

According to another embodiment of these techniques, the duration of the window can be adapted, based on the number of unique discovery signals in the network and the tolerable interference. As an example, if the total number of unique discovery signals is N and the number of cells that are allowed to have overlapping discovery signals is M then the window should be able to accommodate [N/M] non-overlapping discovery signals.

Identifiers of Cells within Discovery Time Window—

In LTE, the terminal device blindly or autonomously detects neighbor cells, i.e., without receiving neighbor cell lists. Therefore, by default the network node does not signal the identifiers of cells that the terminal device is required to measure within the discovery time window. However, the cell identifiers may be provided to the terminal device under one or more of the following conditions or scenarios:

The discovery signals may be transmitted only from a subset of cells on a carrier or, in other words, the on/off scheme is expected to be used or currently used only in few cells on a carrier. In this case, the network node may signal IDs of cells that transmit their discovery signals.

Depending upon the frame time synchronization status of cells that are within the discovery time window: The frame synchronization is described in the next section. If cells are asynchronous, that is, if their frame transmit timings are not within certain pre-defined time, then the network may signal the identifiers of the cells or indices of the discovery signals within the window. Based on the received identities or indices, the terminal device will adjust the length of the discovery signal search window. This is performed in order to accommodate that all the signaled discovery signals are within the discovery search window.

In some embodiments, the terminal device is signaled a list of identities or configuration indices of discovery signals that are associated with a certain discovery time window that the serving eNB configures the terminal device with. Based on the identities, the terminal device will adjust the length of the discovery signal search window. This is performed in order to accommodate that all the signaled discovery signals are within the discovery search window.

Inter-Cell Synchronization—

Sometimes it may be assumed that the network is synchronized. The serving eNB may provide the terminal device with this assumption or it may not.

The cells may or may not be time synchronized with respect to the transmit timings of their frames. "Time synchronization" here means that the frame start timings of cells all fall within a certain absolute delay with respect to one another, e.g., within 3 μs. The information about the discovery time window may also be associated with the synchronization status of the cells. For example, it may be indicated whether the cells to measure within the window are synchronized or not within some pre-defined level (e.g., 3 μs). The indication whether the cells are synchronized or not will assist the terminal device in searching and measuring cells. For example if cells within the window are indicated to be time synchronized, then the terminal device may reuse the detected timing of one cell to identify the reaming cells within the window.

Window Periodicity—

It may be particularly advantageous for the discovery time window to recur periodically, in which case the "discovery time window" repeats after a certain period or interval. In this case, the information about the periodicity of the window also needs to be provided to the terminal device. As with the duration of the time window, the effect of the discovery time window on measurement performance also depends on the periodicity of the window.

One or more possible periodicities of the window can be pre-defined or can be determined by the network node. The network node may determine or select one out of the pre-defined periodicities of discovery time windows based on one or more criteria e.g.

Availability of discovery signals: A more frequent discovery window provides more flexibility for network node to transmit their discovery signals. However it depends upon how frequently the discovery signals are transmitted by different cells for which the window is applicable. If the discovery signals are transmitted by the cells more frequently, but in non-overlapping times, then the network node will have more flexibility in determining the periodicity of the window. For example, if discovery signals are transmitted by all or several cells frequently, such as every 40 milliseconds, then the network node may configure a shorter periodicity, e.g., 40 or 80 milliseconds.

Measurement time: A shorter periodicity of discovery signals leads to a shorter measurement time, since the terminal device can measure more frequently to obtain sufficient measurements samples. In order to reduce measurement time the configured periodicity could be shorter, e.g., 40 or 80 milliseconds.

According to some embodiments, the periodicity of the discovery window can be determined together with the duration of the window. In this case, the combination of periodicity and duration of the window should be selected to provide enough number of non-overlapping discovery signals. Windows with less duration in time and higher periodicity provide better coordination, but are less efficient for terminal device processing.

Consequently, the length and the periodicity of the discovery signaling may be signaled to the terminal device in terms of an index parameter, where each value of the index defines a certain length of the discovery search window and a periodicity of the discovery signal. The index may further be used to indicate other configurable aspects at the same time, for example the subframe offset parameter.

This index can, for example, be used to determine the parameters $\Delta_{DRS}$, $T_{DRS}$ d the duration of the search window. Alternatively the index may only determine a subset of these parameters, e.g., only periodicity.

Starting Time of the Pattern and Number of Windows Per Pattern—

A pattern comprises of one or multiple instances of a discovery time window. A pattern of multiple discovery windows may be used in case the on/off behavior of cells is predictable or known in advance, e.g., one or more seconds in advance. One or more parameters associated with the discovery time window may change after each pattern, i.e., the pattern may be applicable over its periodicity. The terminal device may assume that the parameters for each discovery window within the pattern are the same.

If the pattern contains only one window, then it may be sufficient to indicate the starting time, duration and periodicity of the discovery time window. Such a pattern consisting of only one window is a special case. In this case, the pattern periodicity can be assumed the same as the periodicity of the window, especially if the pattern is configured for an unlimited time.

However, in the case of multiple windows within a pattern, in addition to other parameters, the terminal device may also be provided with an indication of the reference time when the pattern starts. The reference starting time may also be based on SFN of a cell or any other global time (e.g., GPS) as described above. The pattern starting time may also be the starting time of the first discovery time window within the pattern. The pattern related information may further comprise of the number of discovery time windows within the pattern.

Subframe Offset—

The starting time of a discovery window may be configured as the offset relative to the beginning of a radio frame. As an example, a subframe offset of 3 indicates that the discovery window starts at the third subframe of radio frame.

Frequency-Related Information for Discovery Time Window—

The information about the discovery time window (Tw) may be signaled by the network node to the terminal device for each carrier frequency. For example, information about Tw1 and Tw2 applicable to frequencies f1 and f2 respectively is signaled to the terminal device. In one example, the frequencies f1 and f2 can be a primary serving carrier (also referred to as a primary carrier or PCC) and a secondary serving carrier (also referred to as a secondary carrier or SCC) in carrier aggregation, respectively. In another example, the frequencies f1 and f2 can be primary or serving carrier and non-carrier or inter-frequency carrier respectively.

In another exemplary embodiment, two or more discovery time windows (Tw1-i) for a group of cells on the same carrier frequency, f1, can be created. For example, Tw1-1 and Tw1-2 could be applicable for a first set of cells on f1 and a second set of cells on f1 respectively. In this case, the network node may signal the information about plurality of the discovery time windows to the terminal device. The first and second set may also be applicable to the same one or more cells on f1.

Prior to signaling the information to the terminal device, the network node determines one or more sets of frequency related information associated with the discovery time window and signals the determined information to the terminal device. The associated frequency-related information may comprise of one or more of the following:

the carrier frequency of window, which may be expressed in terms of EARFCN, which in case of FDD or HD-FDD may include a UL carrier, a DL carrier or a both;

the bandwidth of discovery signals in the window, which defines the frequency bandwidth over which the discovery signals are transmitted. The bandwidth of the discovery signals may be selected by the system as a function of bandwidths of all cells on the same carrier for which the discovery time window is applicable, for example. Examples of this function are minimum, mean, etc.

the frequency band for which the discovery time window is applicable may also be optionally signaled to the terminal device;

a frequency position of the discovery signal or the search windows frequency position, i.e., where in the allocated frequency band the search window is located. It could be that the window is only located in a specific set of PRBs within the operating system bandwidth. These PRBs maybe signaled directly to the terminal device, as part of the assistance information;

information about RAT of the discovery time window may also be signaled to the terminal device, e.g., LTE FDD, LTE TDD, etc.

Limited Information in the Case of Common Discovery Time Windows—

The discovery time window may be partly or fully the same for multiple carrier frequencies. For example, the same discovery time window may be applicable to cells on PCC and SCC. In another example, the same discovery time windows may be applicable to cells on all carriers configured in CA, e.g., PCC, SCC1 and SCC2. In yet another example, the same discovery time window may be applicable to cells on serving carrier and non-serving carriers or on any two or more non-serving carriers.

When common discovery time windows apply to two or more carriers, the network node may signal only one set of detailed information about the "common" discovery time window applicable to multiple carriers. But, in addition, it may signal information indicating the carriers for which the said discovery time window is applicable.

For example, the network node may signal an indicator informing the terminal device whether the same discovery time window applies or not for measuring on cells on certain carriers (e.g., PCC, SCC, etc.). In this way, the signaling overheads are reduced, since the discovery time window is signaled in conjunction with only one of the carriers for which the same discovery time window is applicable.

It may also be pre-defined that if the terminal device is configured to measure on cells on more than two carriers but the discovery time window is signaled only for one of the said carriers, then the terminal device assumes and use the same the discovery time window for measuring on all cells on all configured carrier.

Methods in a Network Node of Signaling a Composite Pattern of Discovery Signals

The composite pattern or parameters associated with the said parameters described above is signaled to the terminal device. The information may be signaled to the terminal device on a common channel (e.g., broadcast channel) or on a terminal device-specific channel, e.g., PDSCH. The information may even be signaled on a downlink (DL) control channel, e.g., PDCCH. The information may also be signaled via plurality of channels such as RRC, MAC, and DL control channels; for example, the basic configuration or details of parameters are signaled via RRC over PDSCH and activation of pattern when it should be used via PDCCH.

The information may be signaled during initial setup or whenever one or more parameters related to the pattern is changed.

The pattern may also be signaled to another network node, e.g., a neighboring cell over X2, a positioning node over LPPa, etc. The received pattern can be used by the neighboring cell to align the transmission of its own discovery signal and to ensure that it is transmitted within the discovery time window (Tw) of the pattern used in other network nodes. A receiving node, such as a positioning node, may use this for configuring the terminal device for performing positioning measurements, e.g., UE Rx-Tx time difference via LPP.

The signaled information associated with the pattern depends upon the type of pattern. For example, if the pattern is one of the pre-defined patterns then the network node may signal at least a pre-defined identifier of the selected pattern. The network node in this case may also signal a starting time of the pattern in case this is not pre-defined. The network node may also signal a subset or all parameters associated with the pattern, in the event that the parameters are decided and selected by the network node.

Furthermore, if the pattern is aperiodic or if the period changes after certain time, then the information about the pattern or about each discovery time window will be signaled more frequently, e.g., prior to occurrence of each instant of the discovery time window.

It is possible that not all cells on a carrier use or are currently using the on/off scheme. Therefore, in this case the network node may also inform terminal device that the composite pattern applies only to a subset of cells. For example, the network node may signal an indicator of whether the carrier has a mixture of on/off cells and legacy cells (i.e., cells not using on/off scheme). This will enable the terminal device to adapt its measurement procedure as described below.

Methods in a Terminal Device of Obtaining Composite Pattern of Discovery Signals The terminal device, in several embodiments, obtains the information related to one or more composite patterns, the composite patterns defining discovery time windows for measuring on cells on different carriers from the network node as described in section above. The terminal device may be configured with the patterns by its serving network node, e.g., serving eNode or serving RNC in case of inter-RAT measurement on LTE carrier(s) with HSPA serving cell.

However, the terminal device may also partly or fully obtain the pattern or at least certain parameters related to the pattern based on pre-defined rules and/or parameters. For example, it may be pre-defined that the terminal device, when it is configured to measure on discovery signals but has not been provided with the pattern, shall assume that the discovery signals are sent according to a particular pre-defined pattern or default pattern.

The terminal device may also obtain the composite pattern based on stored information or historical data. The pattern may further have a default value defined within the RRC configuration or information element of the actual pattern. For example, the terminal device may reuse the pattern obtained for a certain carrier (f1) for measuring on this carrier at a future time.

The terminal device may also obtain the pattern from another terminal device if both terminal devices are capable of device to device (D2D) operation.

The terminal device, after obtaining the pattern, uses it for performing measurements. However it may also have to adapt or adjust its measurement procedures as described in the next section.

Method of adapting measurement procedures accounting for composite pattern of discovery signals According to several embodiments, the terminal device adapts its one or more measurement procedures according to the obtained one or more composite patterns of the discovery signal associated with the serving cell and/or that of neighboring cells. The network node may also adapt one or more measurement-related procedures, assisting the terminal device to perform the configured measurements and enabling it to meet one or more pre-defined requirements. Examples of the adaptation of the procedures in the terminal device and the network node are described below.

Adapting of Measurement Procedures by Terminal Device—

The patterns and their associated parameters may vary, depending upon the network types, operating conditions, etc. The pattern may also be changed or modified over time. Therefore, a terminal device may obtain different patterns under different circumstances. The terminal device may also have to perform measurements on cells with different patterns. The terminal device may also have to perform relative measurements by comparing measurements done on cells with different patterns.

Therefore, according to this aspect of the presently disclosed techniques, the terminal device adapts one or more of its measurement procedures to ensure that the required measurements are performed even if the pattern is not uniform over time or patterns are different. Some non-limiting examples of adaptation of measurement procedures are:

adapting the measurement sampling rate, e.g., time between successive samples;
adapting the size or length or duration of the measurement sampling;
adapting the measurement sampling time instances;
adapting measurement sampling for legacy cells and cells with on/off scheme.

Figure 6:
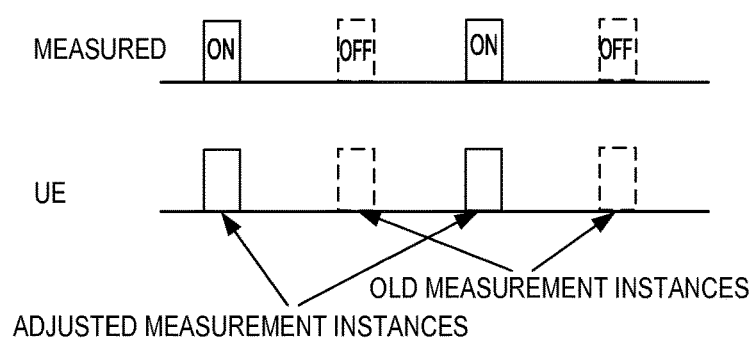
FIG. 6 illustrates an example of adjusting measurement instances in a terminal to a measured cell's on/off pattern.

The adaption of measurement procedure by the terminal device is explained by the following examples:

In one example, if the measurement sampling instant collides with an "off" period of the measured cell, the terminal device adjusts the sampling time to coincide with "on" periods, as shown in FIG. 6, to ensure that the measurement requirements (e.g., measurement accuracy) of the performed measurement are met. According to existing solutions, the terminal device may miss the sample and this will thus degrade the performance. The adjustment can be done individually for each sample, or the measurement periodicity of samples and/or duration can be changed such that it is guaranteed that the terminal device does the measurement during the "on" period of the measured cell.

In another example, if the terminal device obtains information that the composite pattern is applicable only to subset of cells on a carrier, then the terminal device may further adapts its measurement sampling. For example, for this type of "mixed scenario," it may be pre-defined that the terminal device shall perform measurements on legacy cells (which don't transmit discovery signal) as well as on cells for which the composite pattern applies. The pre-defined rule may also specify that the terminal device shall measure at least certain number of identified cells (e.g., 7 cells) out of which some are measured using the pattern and the remaining ones without the pattern, Adapting of Measurement Procedures by Network Node—

The network node may adapt a measurement-related procedure by aligning it with other procedures that influence measurement performance. Examples of such alignments are:

alignment between measurement gaps and discovery time window;

alignment between DRX cycle and discovery time window; and alignment between UL reference signal and discovery window.

The network node may adapt one or more measurement-related procedures performed by the terminal device, enabling the terminal device to enhance measurements done using the obtained composite patterns. The network node may also perform similar adaptations to enhance its own measurements, i.e., measurements done by the network node on terminal device transmitted signals. These adaptations may enable the terminal device or the network node to compensate for reduced measurement opportunities, due to possibly scarce or infrequent measurement opportunities. Examples of these adaptations, based on the several alignment operations listed above, follow.

Alignment of Measurement Gaps with Discovery Time Window—

It may be pre-defined that the discovery time window fully or at least partly falls within the measurement gap configured at the terminal device for measuring on discovery signals on signals on non-serving carriers or carriers requiring measurement gaps. This will require the network node, when it requests the terminal device to measure on discovery signals in gaps, to also configure the measurement gaps so that they at least partly contain the said discovery signals.

It may also be pre-defined that the terminal device shall meet the measurement requirements associated with measurements on the discover signals provided at least part of the discovery time window fully or at least partly falls within the measurement gap. Examples of measurement requirements are measurement time (e.g., L1 measurement period, cell identification delay, reporting delay, etc.), measurement accuracy, identified cells to measure, etc.

It may also be that the terminal device is allowed to relax or meet less stringent measurement requirements in case a certain number of time slot or subframe or set of discovery signals within the discovery time window fall outside the measurement gap. The relaxed or less stringent measurement requirements may correspond to longer measurement time, worse measurement accuracy, fewer cells to measure, etc.

Alignment of DRX Cycle with Discovery Time Window—

When the terminal device is in RRC CONNECTED mode it can be configured with discontinuous receive (DRX) functionality. In DRX mode, in order to save its battery power, the terminal device receiver is active, over an "ON" duration, for a short period of time during which the terminal device is required to monitor DL control channels (e.g., PDCCH). Otherwise, during the OFF duration of the DRX cycle, the terminal device does not have to monitor the DL channels. When a terminal device is configured with a composite pattern to measure on a discovery signal and at the same time is operating in DRX, it is probable that there is no discovery signal during the DRX on duration. In this case, the terminal device has to wake up in between the DRX on instances, degrading its battery life.

To preserve the terminal device battery life, the network node may decide to configure the DRX cycle such that the ON duration fully or partly overlaps with the "discovery time window." This may require the network to adjust the starting time of the DRX cycle and/or of the composite pattern.

The network node may also adjust the parameters related to DRX cycle and/or the composite pattern to facilitate the terminal device power saving. For example, the network node may configure the ON duration of DRX cycle equal to or as close as possible to the duration of the discovery time window within the composite pattern. In another example, the network node may also adjust the DRX cycle length such that the DRX cycle length (also known as DRX periodicity) is the same or is as close as possible to the periodicity of the composite pattern of discovery signals. It may also be pre-defined that the discovery time window is fully or at least partially overlap with the ON duration of the DRX cycle.

In some embodiments, it may be pre-defined that the end of the DRX ON duration and start of the discovery time window or the end of the discovery time window and of the DRX ON duration are within a certain time (Tdrx-w). Tdrx-w can signaled to the terminal device or it can pre-defined. Example values might be 5 milliseconds or 10 milliseconds. The Tdrx-w may also be a function of DRX cycle related parameters, such as periodicity or ON duration and the discovery time window related parameters such as its periodicity or window duration. For example, Tdrx-w can be longer (e.g., 40 milliseconds) if at least one of the DRX cycle periodicity and pattern periodicity is longer than a threshold (e.g., 160 milliseconds or longer).

Alignment of Uplink Reference Signal with Discovery Time Window—

In some embodiments, the network node may configure the terminal device with a UL reference signal (UL RS) that is fully or partly time aligned with the discovery time window. An example of an UL RS is the sounding reference signal (SRS). For example, the UL RS are configured at the terminal device such that at least certain time instances of the occurrence of UL reference signal at least partly coincide in time with the discovery time window of the pattern signaled to the terminal device. This will enable the terminal device to perform UL and DL measurements around the same time, thus reducing terminal device complexity and power consumption. In particular, the alignment will enable the network node and/or terminal device to more easily perform measurements which consist of UL and DL components, e.g., terminal device Rx-Tx time difference, eNodeB Rx-Tx time difference, etc.

Example of Adaptation to Enhance Terminal Device Measurement—

The network node may modify one or more configuration parameters related to the terminal device measurement when the terminal device is configured to measure on a cell with on/off feature, i.e., measure using a composite pattern. These parameters are sent to the terminal device doing measurement to enhance measurement performance. In one example, the network node may configure or modify the filtering related measurement parameters, e.g., longer time to trigger (TTT), hysteresis, L3 filtering co-efficient value, measurement bandwidth, etc.

For example if the pattern periodicity is longer than a threshold (e.g., 320 milliseconds) then filtering parameters are also adapted to ensure measurement accuracy is not degraded. For example the network node may configure a longer time to trigger (TTT) parameter value, e.g., from 320 milliseconds to 1280 milliseconds. In another example, a higher-layer averaging parameter value (e.g., L3 filtering co-efficient value) can be extended, e.g., from 0.5 second to 1 second. In yet another example, the measurement bandwidth over which the measurement is done can be extended, e.g., from 25 RBs (5 MHz) to 50 RBs (10 MHz). The adaption of measurement configuration parameters (e.g., extending the value) will improve the measurement accuracy when terminal device cannot perform measurement at frequent interval due to sparse pattern.

Example of Adaptation to Enhance Network Node Measurement—

The terminal device may transmit its UL signals or UL reference signals less frequently when the serving cell is operating in on/off mode and/or when it is configured to measure on cells using a composite pattern.

The network node performs measurements on DL transmitted signals and/or UL received signals. Examples of network node measurements are DL transmitted power, UL SINR, propagation delay, RX-Tx time difference, etc.

The network node may take into account the transmission of DL and/or UL signals when performing a measurement and thereby adapt one or more measurement configuration parameters used for the said network node measurements. For example, the network node may extend the measurement period depending upon the periodicity of the discovery signal in the DL and/or UL RS transmitted by the terminal device. For example, the radio node may measure SINR over 200 milliseconds instead of 100 milliseconds in the event that the cell is "off" during over half of the measurement samples. In another example, the network node may extend the measurement period and also perform measurement over a larger bandwidth, e.g., over 50 RBs instead of 15 RBs. The extending of the measurement period and/or measurement bandwidth will enhance the performance of the performed measurement.

Methods in Terminal Device of Signaling Capability Related to Measurement Based on Composite Pattern of Discovery Signals According to some embodiments, the terminal device signals capability information to the network node (a serving network node such as base station, eNodeB, RNC, BSC, core network, positioning node, etc.) indicating whether the terminal device is capable of using information related to the obtained composite pattern of discovery signals for performing measurements on one or more cells. The terminal device capability information may further indicate whether the terminal device is also capable of obtaining the composite pattern autonomously or based on one or more pre-defined rules.

The terminal device capability information may also contain additional or more specific information. For example it may indicate whether it can perform the measurements using composite pattern on cells on any configured carriers on serving carrier only, on inter-frequency carriers, on all or subset of component carriers in multi-carrier, etc. It may further indicate whether it is capable of using the composite pattern for any kind of measurement supported by the terminal device or only for specific type of measurements, e.g., RSRP, RSRQ, etc.

The terminal device may signal the above mentioned capability information to the other node in any of the following manners:

Proactive reporting without receiving any explicit request from the other node (e.g., serving node or any target network node);

Reporting upon receiving any explicit request from the other node (e.g., serving node or any target network node);

The explicit request can be sent to the terminal device by the other node anytime or at any specific occasion. For example the request for the capability reporting can be sent to the terminal device during initial setup or after a cell change (e.g., handover, RRC connection re-establishment, RRC connection release with redirection, PCell change in carrier aggregation (CA) or multicarrier (MC), primary component carrier (PCC) change in CA or MC, etc.).

In case of proactive reporting the terminal device may report its capability in the capability information during one or more of the following occasions:

During initial setup or call setup with the network node, e.g., when establishing the RRC connection;

During cell change, e.g., handover, primary carrier change in multi-carrier operation, PCell change in multi-carrier operation, RRC re-establishment, RRC connection release with redirection, etc.

The acquired terminal device capability information may be used by the network node (e.g., eNodeB, base station, positioning node, etc.) for performing one or more radio operation tasks or network management tasks:

The tasks comprise forwarding the received terminal device capability information to another network node, which may use it after cell change of the terminal device.

The network node may also decide, based on the received information, whether to signal the composite pattern to the terminal device or not.

The network node may also decide, based on the received information, whether to signal the composite pattern to the terminal device for all configured carriers or for specific carriers, e.g., only for serving carrier.

The several methods described above may be used to provide several advantages. For example, the disclosed methods provide sufficient freedom to the network for turning the cells on and off. Further, terminal device complexity when measuring on cells using on/off scheme may be reduced. The disclosed methods may be used to enable the terminal device to save its battery or use its battery more efficiently when measuring on cells using on/off scheme is reduced. Finally, terminal device measurement behavior is well specified, leading to consistent measurement results for the measurement done on cells using on/off scheme.

Various methods and techniques were described above. Example embodiments of those methods and techniques include, but are not limited to, those example embodiments in the following list. It will be appreciated that each of these examples may be modified according to any of the above variations and examples, and it will be appreciated that any of the operations summarized below may be based on or otherwise utilize one or more of the criteria and/or parameters discussed above.

(a) A method, in a network node, comprising:
  obtaining (e.g., determining, creating) a discovery signal window pattern, the discovery signal window pattern defining one or more discovery signal windows during which each of a plurality of cells is to transmit a corresponding discovery signal; and
  sending an indication of the discovery signal window pattern to a terminal device.
(b) The method of (a), further comprising adapting one or more measurement procedures carried out by the network node, based on the discovery signal window pattern.
(c) The method of (a), wherein obtaining the discovery signal window pattern comprises determining a timing of the discovery signal window pattern based on a DRX cycle.
(d) The method of (a), further comprising adapting a DRX cycle based on the discovery signal window pattern.
(e) The method of (a), further comprising adapting one or more measurement gaps based on the discovery signal window pattern.
(f) The method of (a), further comprising adapting a measurement configuration parameter for the terminal device, based on the discovery signal window pattern.
(g) The method of (a), further comprising first receiving an indication from the terminal device that the terminal device supports measurements based on a discovery signal window pattern.
(h) A method, in a terminal device, comprising:
  receiving an indication of a discovery signal window pattern from a network node, the discovery signal window pattern defining one or more discovery signal windows during which each of a plurality of cells is to transmit a corresponding discovery signal; and
  performing measurements for one or more of the plurality of cells during the one or more discovery signal windows.
(i) The method of (h), further comprising first sending, to the network node, an indication that the terminal device supports measurements based on a discovery signal window pattern.
(j) A method, in a terminal device, comprising:
  determining a discovery signal window pattern, the discovery signal window pattern defining one or more discovery signal windows during which each of a plurality of cells is to transmit a corresponding discovery signal; and
  performing measurements for one or more of the plurality of cells during the one or more discovery signal windows.

Example Process Flows

Figure 7:
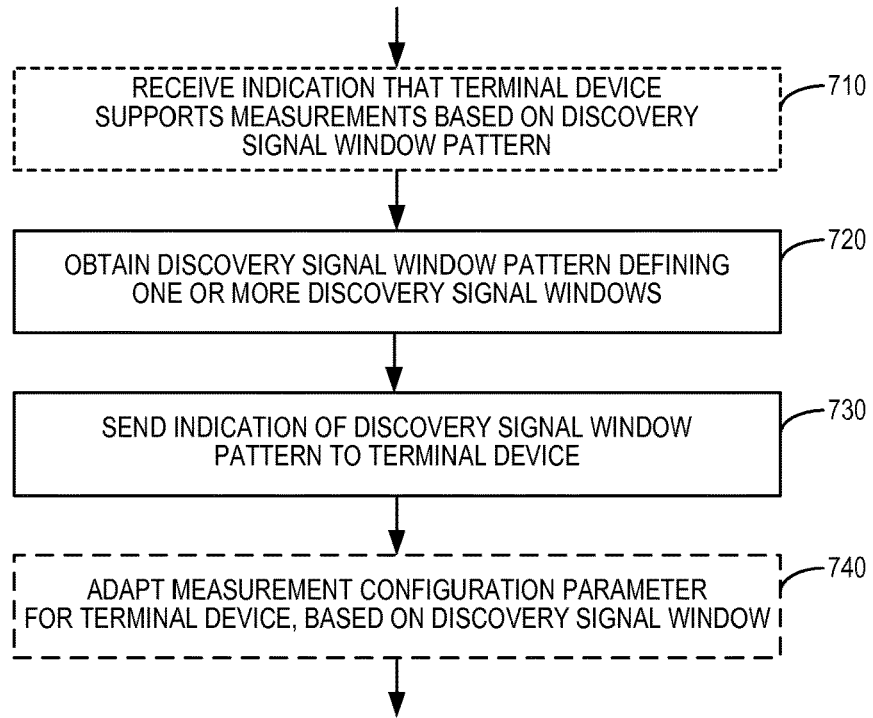
FIG. 7 is a process flow diagram illustrating an example method as carried out in a network node.
Figure 8:
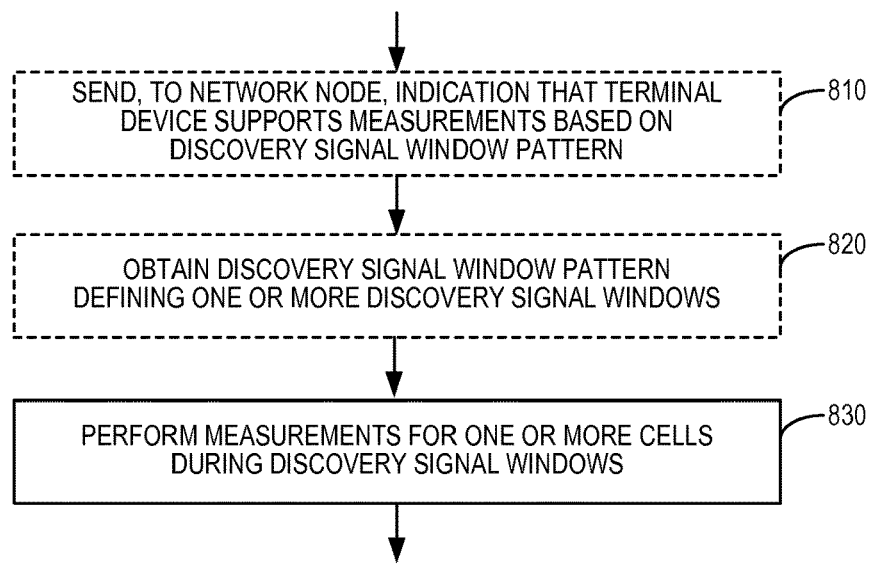
FIG. 8 is a process flow diagram illustrating an example method as carried out in a terminal device.

In view of the detailed examples presented above, it will be appreciated that FIGS. 7 and 8 are process flow diagrams illustrating example methods, according to some of the above-described techniques, as carried out by a network node and a terminal device, respectively.

More particularly, FIG. 7 illustrates a method in a network node. As shown at block 720, the illustrated method includes obtaining a discovery signal window pattern, the discovery signal window pattern defining one or more discovery signal windows during which each of a plurality of cells is to transmit a corresponding discovery signal. As shown at block 730, the illustrated method further includes sending an indication of the discovery signal window pattern to a terminal device.

In some embodiments, the method may comprise first receiving an indication from the terminal device that the terminal device is capable of performing measurements based on a discovery signal window pattern. This is shown in FIG. 7 at block 710, which is outlined with a dashed line to indicate that it need not necessarily appear in every embodiment or instance of the illustrated method.

In other embodiments, the method may further comprise adapting one or more configuration parameters for the terminal device, based on the discovery signal window pattern. This is shown at block 740, which is also outlined with a dashed line, since it need not necessarily appear in every embodiment or instance of the illustrated method. Similarly, some embodiments may comprise adapting one or more measurement gaps based on the discovery signal window pattern; this may include configuring the measurement gaps such that at least one of the one or more discovery signal windows is at least partly contained in a measurement gap. In some of these and in some other embodiments, the method may further comprise adapting one or more measurement procedures carried out by the network node, based on the discovery signal window pattern.

In some embodiments of the illustrated method, sending the indication of the discovery signal window pattern to the terminal device comprises sending one or more parameters that specify one or more of the following: a window duration; a window periodicity; a subframe offset parameter; and a bandwidth for one or more discovery signals to be found with the discovery signal window pattern.

In some embodiments, obtaining the discovery signal window pattern comprises determining a timing of the discovery signal window pattern based on a DRX cycle.

In some embodiments, sending the indication of the discovery signal window pattern to the terminal device comprises sending a parameter that identifies one of a plurality of predetermined patterns known to the terminal device. In some embodiments, the method further comprises sending an indication of the discovery signal window pattern to a second network node.

FIG. 8 illustrates an example method, according to some of the above-described techniques, as carried out in a terminal device. The illustrated method includes, as shown at block 820, obtaining a discovery signal window pattern, the discovery signal window pattern defining one or more discovery signal windows during which each of a plurality of cells is to transmit a corresponding discovery signal. As shown at block 830, the method further comprises performing one or more measurements for one or more of the plurality of cells during the one or more discovery signal windows.

In some embodiments, the illustrated method further comprises first sending, to the network node, an indication that the terminal device is capable of performing measurements based on a discovery signal window pattern. This is shown at block 810, which is illustrated with a dashed line to indicate that it need not appear in every embodiment or instance of the illustrated method.

In some embodiments, obtaining the discovery signal window pattern comprises receiving an indication of the discovery signal window pattern from a network node. In some of these embodiments, receiving the indication of the discovery signal window pattern comprises receiving one or more parameters that specify one or more of the following: a window duration; a window periodicity; a subframe offset parameter; and a bandwidth for one or more discovery signals to be found with the discovery signal window pattern. In other embodiments, receiving the indication of the discovery signal window pattern comprises receiving a parameter that identifies one of a plurality of predetermined patterns known to the terminal device.

In some embodiments, obtaining the discovery signal window pattern comprises determining, in the terminal device, one or more parameters defining the discovery signal window pattern.

In some embodiments, the method further comprises performing one or more measurements in measurement gaps and meeting the corresponding measurements requirements provided that the discovery signal window is at least partly contained in a measurement gap.

It will be appreciated that many variations of the methods illustrated in FIGS. 7 and 8 are possible, according to any combination of the many examples described in detail above.

Example Hardware Implementations

It will be appreciated that embodiments of the presently disclosed technology include apparatus configured to carry out the various network-based and terminal-based methods described above. Thus, for example, embodiments include a network node that is adapted to: obtain a discovery signal window pattern, the discovery signal window pattern defining one or more discovery signal windows during which each of a plurality of cells is to transmit a corresponding discovery signal; and send an indication of the discovery signal window pattern to a terminal device. Other embodiments include a terminal device adapted to: obtain a discovery signal window pattern, the discovery signal window pattern defining one or more discovery signal windows during which each of a plurality of cells is to transmit a corresponding discovery signal; and perform one or more measurements for one or more of the plurality of cells during the one or more discovery signal windows. Still other embodiments include variations of these, according to any one or more of the detailed examples given above.

Figure 9:
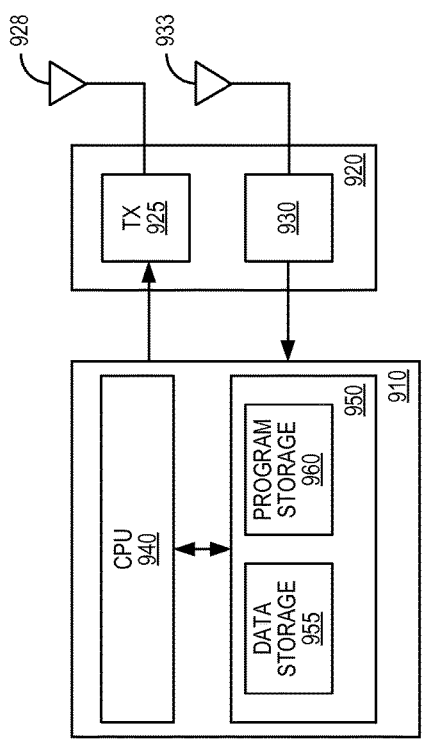
FIG. 9 is a block diagram illustrating components of an example terminal device.

Several of the techniques and methods described above may be implemented using radio circuitry and electronic data processing circuitry provided in a mobile terminal. FIG. 9 illustrates features of an example mobile terminal 900 according to several embodiments of the present invention. Mobile terminal 900, which may be a terminal device configured for dual-connectivity operation with an LTE wireless communication network (E-UTRAN), for example, comprises a radio transceiver circuit 920 configured to communicate with one or more base stations as well as a processing circuit 910 configured to process the signals transmitted and received by the transceiver unit 920. Transceiver circuit 920 includes a transmitter 925 coupled to one or more transmit antennas 928 and receiver 930 coupled to one or more receiver antennas 933. The same antenna(s) 928 and 933 may be used for both transmission and reception. Receiver 930 and transmitter 925 use known radio processing and signal processing components and techniques, typically according to a particular telecommunications standard such as the 3GPP standards for LTE. Note also that transmitter circuit 920 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 910 comprises one or more processors 940 coupled to one or more memory devices 950 that make up a data storage memory 955 and a program storage memory 960. Processor 940, identified as CPU 940 in FIG. 9, may be a microprocessor, microcontroller, or digital signal processor, in some embodiments. More generally, processing circuit 910 may comprise a processor/firmware combination, or specialized digital hardware, or a combination thereof. Memory 950 may comprise one or several types of memory such as read-only memory (ROM), random-access memory, cache memory, flash memory devices, optical storage devices, etc. Because terminal 900 supports multiple radio access networks, processing circuit 910 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 910 include modulation and coding of transmitted signals and the demodulation and decoding of received signals. In several embodiments of the present invention, processing circuit 910 is adapted, using suitable program code stored in program storage memory 960, for example, to carry out one of the techniques described above for receiving discovery signal window patterns and performing measurements accordingly. Of course, it will be appreciated that not all of the steps of these techniques are necessarily performed in a single microprocessor or even in a single module.

Figure 10:
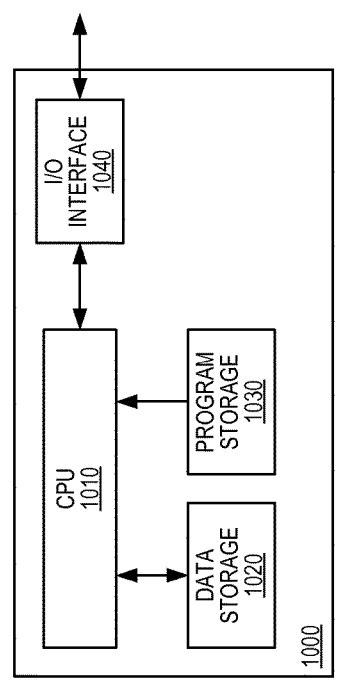
FIG. 10 is a block diagram illustrating components of an example network node.

Similarly, several of the techniques and processes described above can be implemented in a network node, such as an eNodeB or other node in a 3GPP network. FIG. 10 is a schematic illustration of a network node apparatus 1000 in which a method embodying any of the presently described network-based techniques can be implemented. A computer program for controlling the node 1000 to carry out a method embodying the present invention is stored in a program storage 1030, which comprises one or several memory devices. Data used during the performance of a method embodying the present invention is stored in a data storage 1020, which also comprises one or more memory devices. During performance of a method embodying the present invention, program steps are fetched from the program storage 1030 and executed by a Central Processing Unit (CPU) 1010, retrieving data as required from the data storage 1020. Output information resulting from performance of a method embodying the present invention can be stored back in the data storage 1020, or sent to a communications interface circuit 1040, which includes circuits configured to send and receive data to and from other network nodes and which may also include a radio transceiver configured to communicate with one or more mobile terminals.

Accordingly, in various embodiments of the invention, processing circuits, such as the CPU 1010 and memory circuits 1020 and 1030 in FIG. 10, are configured to carry out one or more of the techniques described in detail above. Likewise, other embodiments may include base stations and/or radio network controllers that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 11:
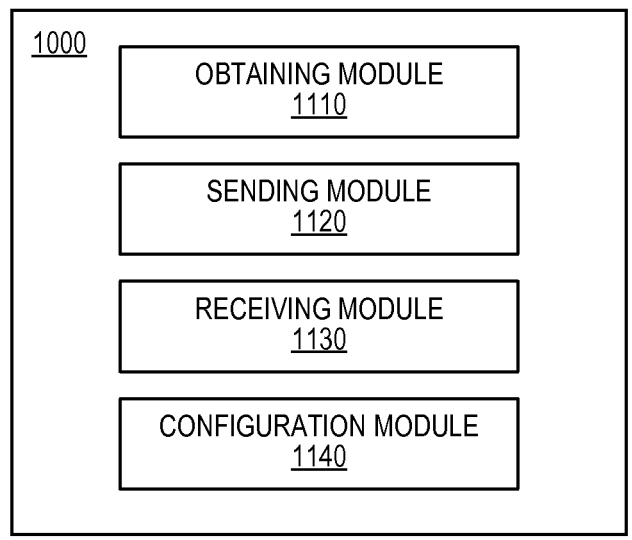
FIG. 11 provides another view of an example network node.

FIG. 11 schematically illustrates an alternative embodiment of a network node 1000 configured to carry out one or more of the methods described above. The network node 1000 of FIG. 11 comprises an obtaining module 1110, which is adapted to obtain a discovery signal window pattern, the discovery signal window pattern defining one or more discovery signal windows during which each of a plurality of cells is to transmit a corresponding discovery signal. The network node 1000 of FIG. 11 further comprises a sending module 1120, which is adapted to send an indication of the discovery signal window pattern to a terminal device. In addition, network node 1000 comprises a receiving module 1130, adapted to receive an indication from the terminal device that the terminal device is capable of performing measurements based on a discovery signal window pattern, as well as a configuration module 1140 adapted to adapt one or more measurement configuration parameters for the terminal device, based on the discovery signal window pattern.

The several variations of the technique illustrated in FIG. 7 and detailed above are also applicable to the network node 1000 of FIG. 11. Thus, in some embodiments, the network node 1000 further comprises a measurement module (not shown in FIG. 11) for adapting one or more measurement procedures carried out by the network node, based on the discovery signal window pattern. In some embodiments, the sending module 1120 sends one or more parameters that specify one or more of the following: a window duration; a window periodicity; a subframe offset parameter; and a bandwidth for one or more discovery signals to be found with the discovery signal window pattern.

In some embodiments, the obtaining module 1110 is adapted to determine a timing of the discovery signal window pattern based on a DRX cycle.

In some embodiments, the configuration module 1140 is configured to adapt one or more measurement gaps based on the discovery signal window pattern. This may comprise configuring the measurement gaps such that at least one of the one or more discovery signal windows is at least partly contained in a measurement gap In some embodiments, the sending module 1120 is adapted to send an indication of the discovery signal window pattern to a second network node. In some of these and in some other embodiments, the sending module 1120 sends the terminal device a parameter that identifies one of a plurality of predetermined patterns known to the terminal device.

It will be appreciated that each of the several modules shown in FIG. 11 may be implemented, in full or in part, with appropriate program code running on a processor; thus, the various modules may be understood to correspond to modules or units of program code, in some embodiments, and to corresponding hardware and/or hardware/software combinations, in others, and to a mixture of both, in still others.

Figure 12:
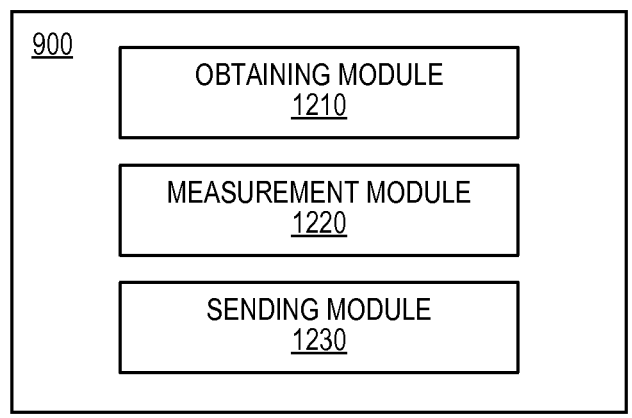
FIG. 12 provides another view of an example terminal device.

Similarly, FIG. 12 schematically illustrates an alternative embodiment of a terminal 900. As shown in FIG. 12, the terminal 900 includes an obtaining module 1210 adapted to obtain a discovery signal window pattern, the discovery signal window pattern defining one or more discovery signal windows during which each of a plurality of cells is to transmit a corresponding discovery signal. The terminal 900 further includes a measurement module 1220 adapted to perform one or more measurements for one or more of the plurality of cells during the one or more discovery signal windows. The terminal 900 shown in FIG. 12 further includes a sending module 1230, which is adapted to send, to the network node, an indication that the terminal device is capable of performing measurements based on a discovery signal window pattern.

In some embodiments, the obtaining module 1210 is adapted to receive an indication of the discovery signal window pattern from a network node. This may comprise receiving receiving one or more parameters that specify one or more of the following: a window duration; a window periodicity; a subframe offset parameter; and a bandwidth for one or more discovery signals to be found with the discovery signal window pattern. In some embodiments, the obtaining module 1210 may be adapted to receive a parameter that identifies one of a plurality of predetermined patterns known to the terminal device. In some of these and in some other embodiments, the obtaining module 1210 itself may determine one or more parameters defining the discovery signal window pattern.

In some embodiments, the measurement module 1220 is adapted to perform one or more measurements in measurement gaps and meeting the corresponding measurements requirements provided that the discovery signal window is at least partly contained in a measurement gap.

Once again, it will be appreciated that each of the several modules shown in FIG. 12 may be implemented, in full or in part, with appropriate program code running on a processor; thus, the various modules may be understood to correspond to modules or units of program code, in some embodiments, and to corresponding hardware and/or hardware/software combinations, in others, and to a mixture of both, in still others.

It will be appreciated by the person of skill in the art that various modifications may be made to the above described embodiments without departing from the scope of the present invention. For example, although embodiments of the present invention have been described with examples that include a communication system compliant to the 3GPP-specified LTE standards, it should be noted that the solutions presented may be equally well applicable to other networks that support dual connectivity. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions, which can be understood to constitute a "computer program product," may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a base station of a cellular network, the method comprising:
   obtaining a discovery signal window pattern, the discovery signal window pattern defining one or more discovery signal windows during which each of a plurality of cells of a cellular network is to transmit a corresponding discovery signal, each of the discovery signal windows comprising a plurality of subframes in which separate discovery signals can be transmitted; and
   sending an indication of the discovery signal window pattern from the base station to a terminal device.

2. The method of claim 1, further comprising adapting one or more measurement procedures carried out by the base station, based on the discovery signal window pattern.

3. The method of claim 1, wherein sending the indication of the discovery signal window pattern to the terminal device comprises sending one or more parameters that specify one or more of the following:
   a window duration;
   a window periodicity;
   a subframe offset parameter; and
   a bandwidth for one or more discovery signals to be found with the discovery signal window pattern.

4. The method of claim 1, wherein obtaining the discovery signal window pattern comprises determining a timing of the discovery signal window pattern based on a Discontinuous Reception (DRX) cycle.

5. The method of claim 1, further comprising adapting one or more measurement gaps based on the discovery signal window pattern.

6. The method of claim 5, wherein adapting the one or more measurement gaps comprises configuring the measurement gaps such that at least one of the one or more discovery signal windows is at least partly contained in a measurement gap.

7. The method of claim 1, further comprising adapting one or more measurement configuration parameters for the terminal device, based on the discovery signal window pattern.

8. The method of claim 1, further comprising first receiving an indication from the terminal device that the terminal device is capable of performing measurements based on a discovery signal window pattern.

9. The method of claim 1, further comprising sending an indication of the discovery signal window pattern to a second network node.

10. The method of claim 1, wherein sending the indication of the discovery signal window pattern to the terminal device comprises sending a parameter that identifies one of a plurality of predetermined patterns known to the terminal device.

11. A method, in a terminal device, comprising:
   obtaining a discovery signal window pattern, the discovery signal window pattern defining one or more discovery signal windows during which a base station for each of a plurality of cells of a cellular network is to transmit a corresponding discovery signal, each of the discovery signal windows comprising a plurality of subframes in which separate discovery signals can be transmitted; and
   performing one or more measurements for one or more of the plurality of cells during the one or more discovery signal windows.

12. The method of claim 11, wherein obtaining the discovery signal window pattern comprises receiving an indication of the discovery signal window pattern from a base station.

13. The method of claim 12, further comprising first sending, to the base station, an indication that the terminal device is capable of performing measurements based on a discovery signal window pattern.

14. The method of claim 12, wherein receiving the indication of the discovery signal window pattern comprises receiving one or more parameters that specify one or more of the following:
   a window duration;
   a window periodicity;
   a subframe offset parameter; and
   a bandwidth for one or more discovery signals to be found with the discovery signal window pattern.

15. The method of claim 12, wherein receiving the indication of the discovery signal window pattern comprises receiving a parameter that identifies one of a plurality of predetermined patterns known to the terminal device.

16. The method of claim 11, wherein obtaining the discovery signal window pattern comprises determining, in the terminal device, one or more parameters defining the discovery signal window pattern.

17. The method of claim 11, further comprising performing one or more measurements in measurement gaps and meeting the corresponding measurements requirements provided that the discovery signal window is at least partly contained in a measurement gap.

18. A base station comprising a communications interface circuit and a processing circuit, wherein the processing circuit is configured to:
   obtain a discovery signal window pattern, the discovery signal window pattern defining one or more discovery signal windows during which each of a plurality of cells of a cellular network is to transmit a corresponding discovery signal, each of the discovery signal windows comprising a plurality of subframes in which separate discovery signals can be transmitted; and
   send an indication of the discovery signal window pattern from the base station to a terminal device.

19. The base station of claim 18, wherein the processing circuit is further configured to adapt one or more measurement procedures carried out by the base station, based on the discovery signal window pattern.

20. The base station of claim 18, wherein the processing circuit is configured to send the indication of the discovery signal window pattern to the terminal device by sending one or more parameters that specify one or more of the following:
   a window duration;
   a window periodicity;
   a subframe offset parameter; and
   a bandwidth for one or more discovery signals to be found with the discovery signal window pattern.

21. The base station of claim 18, wherein the processing circuit is configured to obtain the discovery signal window pattern by determining a timing of the discovery signal window pattern based on a Discontinuous Reception (DRX) cycle.

22. The base station of claim 18, wherein the processing circuit is further configured to adapt one or more measurement gaps based on the discovery signal window pattern.

23. The base station of claim 22, wherein the processing circuit is configured to adapt the one or more measurement gaps by configuring the measurement gaps such that at least one of the one or more discovery signal windows is at least partly contained in a measurement gap.

24. The base station of claim 18, wherein the processing circuit is further configured to adapt one or more measurement configuration parameters for the terminal device, based on the discovery signal window pattern.

25. The base station of claim 18, wherein the processing circuit is further configured to receive an indication from the terminal device that the terminal device is capable of performing measurements based on a discovery signal window pattern, prior to sending the indication of the discovery signal window pattern to the terminal device.

26. The base station of claim 18, wherein the processing circuit is further configured to send an indication of the discovery signal window pattern to a second network node.

27. The base station of claim 18, wherein the processing circuit is further configured to send the indication of the discovery signal window pattern to the terminal device by sending a parameter that identifies one of a plurality of predetermined patterns known to the terminal device.

28. A terminal device comprising a transceiver circuit and a processing circuit, wherein the processing circuit is configured to:
   obtain a discovery signal window pattern, the discovery signal window pattern defining one or more discovery signal windows during which a base station for each of a plurality of cells of a cellular network is to transmit a corresponding discovery signal, each of the discovery signal windows comprising a plurality of subframes in which separate discovery signals can be transmitted; and
   perform one or more measurements for one or more of the plurality of cells during the one or more discovery signal windows.

29. The terminal device of claim 28, wherein the processing circuit is configured to obtain the discovery signal window pattern by receiving an indication of the discovery signal window pattern from a base station.

30. The terminal device of claim 29, wherein the processing circuit is further configured to send, to the base station, an indication that the terminal device is capable of performing measurements based on a discovery signal window pattern.

31. The terminal device of claim 29, wherein the processing circuit is configured to receive the indication of the discovery signal window pattern by receiving one or more parameters that specify one or more of the following:
   a window duration;
   a window periodicity;
   a subframe offset parameter; and
   a bandwidth for one or more discovery signals to be found with the discovery signal window pattern.

32. The terminal device of claim 29, wherein the processing circuit is configured to receive the indication of the discovery signal window pattern by receiving a parameter that identifies one of a plurality of predetermined patterns known to the terminal device.

33. The terminal device of claim 28, wherein the processing circuit is configured to obtain the discovery signal window pattern by determining, in the terminal device, one or more parameters defining the discovery signal window pattern.

34. A non-transitory computer-readable medium comprising, stored thereupon, a computer program product comprising program instructions that, when executed by a processing circuit of a base station in a communications network, cause the base station to:
   obtain a discovery signal window pattern, the discovery signal window pattern defining one or more discovery signal windows during which each of a plurality of cells of a cellular network is to transmit a corresponding discovery signal, each of the discovery signal windows comprising a plurality of subframes in which separate discovery signals can be transmitted; and
   send an indication of the discovery signal window pattern from the base station to a terminal device, using the communications interface circuit.

35. A non-transitory computer-readable medium comprising, stored thereupon, a computer program product comprising program instructions that, when executed by a processing circuit of a terminal device operating in a communications network, cause the terminal device to:
   obtain a discovery signal window pattern, the discovery signal window pattern defining one or more discovery signal windows during which a base station for each of a plurality of cells of a cellular network is to transmit a corresponding discovery signal, each of the discovery signal windows comprising a plurality of subframes in which separate discovery signals can be transmitted; and
   perform one or more measurements for one or more of the plurality of cells during the one or more discovery signal windows, using the transceiver circuit.

* * * * *

UNITED STATES PATENT AND TRADEMARK OFFICE
CERTIFICATE OF CORRECTION

PATENT NO. : 10,219,217 B2
APPLICATION NO. : 14/421930
DATED : February 26, 2019
INVENTOR(S) : Larsson et al.

It is certified that error appears in the above-identified patent and that said Letters Patent is hereby corrected as shown below:

In the Specification

Column 16, Line 54, delete "$n_t$" and insert -- $n_f$ --, therefor.

Signed and Sealed this
Twenty-fifth Day of June, 2019

Andrei Iancu
*Director of the United States Patent and Trademark Office*